United States Patent
Bowman et al.

(10) Patent No.: US 12,271,853 B2
(45) Date of Patent: Apr. 8, 2025

(54) METHODS AND APPARATUS TO MONITOR AND MANAGE LOADING DOCK OPERATIONS

(71) Applicant: Rite-Hite Holding Corporation, Milwaukee, WI (US)

(72) Inventors: Kenneth C. Bowman, Cedarburg, WI (US); James C. Boerger, Franksville, WI (US); Chad Dillavou, Cedarburg, WI (US); Richard Mews, Bonduel, WI (US); Timothy Kubly, Ixonia, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 232 days.

(21) Appl. No.: 17/765,727

(22) PCT Filed: Sep. 24, 2020

(86) PCT No.: PCT/US2020/052505
§ 371 (c)(1),
(2) Date: Mar. 31, 2022

(87) PCT Pub. No.: WO2021/091679
PCT Pub. Date: Apr. 15, 2021

(65) Prior Publication Data
US 2022/0405695 A1    Dec. 22, 2022

Related U.S. Application Data

(60) Provisional application No. 62/911,855, filed on Oct. 7, 2019.

(51) Int. Cl.
G06Q 10/0639    (2023.01)
G06Q 10/0631    (2023.01)
G06Q 10/08      (2024.01)

(52) U.S. Cl.
CPC .......... *G06Q 10/0639* (2013.01); *G06Q 10/06316* (2013.01); *G06Q 10/08* (2013.01)

(58) Field of Classification Search
CPC ........ G06Q 10/0639; G06Q 10/06316; G06Q 10/08; G05B 19/4155
(Continued)

(56) References Cited

U.S. PATENT DOCUMENTS

2013/0312205 A1    11/2013   Riviere et al.
2015/0019277 A1    1/2015    Kostival et al.
(Continued)

FOREIGN PATENT DOCUMENTS

BR    102013018502 A2    6/2016
CN       107451720 A     12/2017
(Continued)

OTHER PUBLICATIONS

International Searching Authority, "International Search Report and Written Opinion" issued in connection with PCT application No. PCT/US2020/052505, issued on Dec. 16, 2020, 11 pages.
(Continued)

*Primary Examiner* — Ariel J Yu
*Assistant Examiner* — Denisse Y Ortiz Roman
(74) *Attorney, Agent, or Firm* — Hanley, Flight & Zimmerman, LLC

(57) ABSTRACT

Methods and apparatus to monitor and manage loading dock operations are disclosed. An example apparatus includes a sensor feedback analyzer to analyze feedback from sensors associated with a dock at a material handling facility to determine durations for completion of tasks in a sequence of operations associated with loading or unloading of a trailer at the dock based on the feedback. The apparatus also includes an efficiency analyzer to compare the durations to target thresholds associated with the tasks. The apparatus
(Continued)

further includes a user interface generator to generate a user interface indicating at least one of the durations or the target thresholds.

30 Claims, 21 Drawing Sheets

(58) Field of Classification Search
USPC .......................................................... 705/28
See application file for complete search history.

(56) References Cited

U.S. PATENT DOCUMENTS

| | | | |
|---|---|---|---|
| 2017/0186124 A1 | | 6/2017 | Jones et al. |
| 2020/0167734 A1* | | 5/2020 | Hoofard ................. B65G 69/28 |
| 2021/0082220 A1 | | 3/2021 | Boerger et al. |

FOREIGN PATENT DOCUMENTS

| | | | | |
|---|---|---|---|---|
| CN | 106651049 B | * | 11/2020 | |
| CN | 110516976 B | * | 12/2022 | ....... G06Q 10/06312 |
| JP | S51087885 U | | 7/1976 | |
| JP | H10297716 A | | 11/1998 | |
| JP | H11029209 A | | 2/1999 | |
| JP | 2002149771 A | | 5/2002 | |
| JP | 2009166938 A | | 7/2009 | |
| JP | 6539395 B1 | | 7/2019 | |
| JP | 2021517099 A | | 7/2021 | |
| KR | 20090110611 A | | 10/2009 | |
| WO | 2017062638 | | 4/2017 | |
| WO | WO-2017062638 A1 | * | 4/2017 | ............... B60Q 3/76 |
| WO | 2019173811 | | 9/2019 | |

OTHER PUBLICATIONS

Intellectual Property Office of Vietnam, "Result of Substantive Examination," issued in connection with Vietnamese Patent Application No. 1-2022-02617, dated Aug. 30, 2024, 4 pages. [English translation included].
Japan Patent Office, "Search Report by Registered Search Organization," issued in connection with Japanese Patent Application No. 2022-520546, dated Oct. 28, 2024, 43 pages. [English translation included].
International Searching Authority, "International Preliminary Report on Patentability," issued in connection with PCT Patent Application No. PCT/US20/52505, issued on Apr. 21, 2022, 6 pages.
Japanese Patent Office, "Notice of Reasons for Refusal," issued in connection with Japanese Patent Application No. 2022-520546, dated Dec. 3, 2024, 8 pages. (English translation included).
Intellectual Property Office of Singapore, "Search Report" issued in connection with Singaporean Patent Application No. 11202203378S, dated Dec. 31, 2024, 3 pages.
Intellectual Property Office of Singapore, "Written Opinion" issued in connection with Singaporean Patent Application No. 11202203378S, dated Dec. 31, 2024, 8 pages.

* cited by examiner

METHODS AND APPARATUS TO MONITOR AND MANAGE LOADING DOCK OPERATIONS

RELATED APPLICATION(S)

This patent arises from a national stage entry of International PCT Application No. PCT/US2020/052505, which was filed on Sep. 24, 2020, and which claims the benefit of U.S. Provisional Patent Application No. 62/911,855, which was filed on Oct. 7, 2019. International PCT Application No. PCT/US2020/052505 and U.S. Provisional Patent Application No. 62/911,855 are incorporated herein by reference in their entireties. Priority to International PCT Application No. PCT/US2020/052505 and U.S. Provisional Patent Application No. 62/911,855 is claimed.

FIELD OF THE DISCLOSURE

This disclosure relates generally to loading docks, and, more particularly, to methods and apparatus to monitor and manage loading dock operations.

BACKGROUND

Loading docks provide an area for vehicles (e.g., trucks, trailers, etc.) to move next to an elevated platform of a building (e.g., a material handling facility) so that cargo can be readily transferred between the vehicle and the building. Some loading docks include equipment such as dock levelers, vehicle restraints, and/or dock doors, any of which may be associated with one or more sensor/monitoring systems.

BRIEF DESCRIPTION OF THE DRAWINGS

FIGS. 15-23 illustrate example graphical user interfaces that may be generated by the main server of FIGS. 1 and/or 14.

Figure 1:
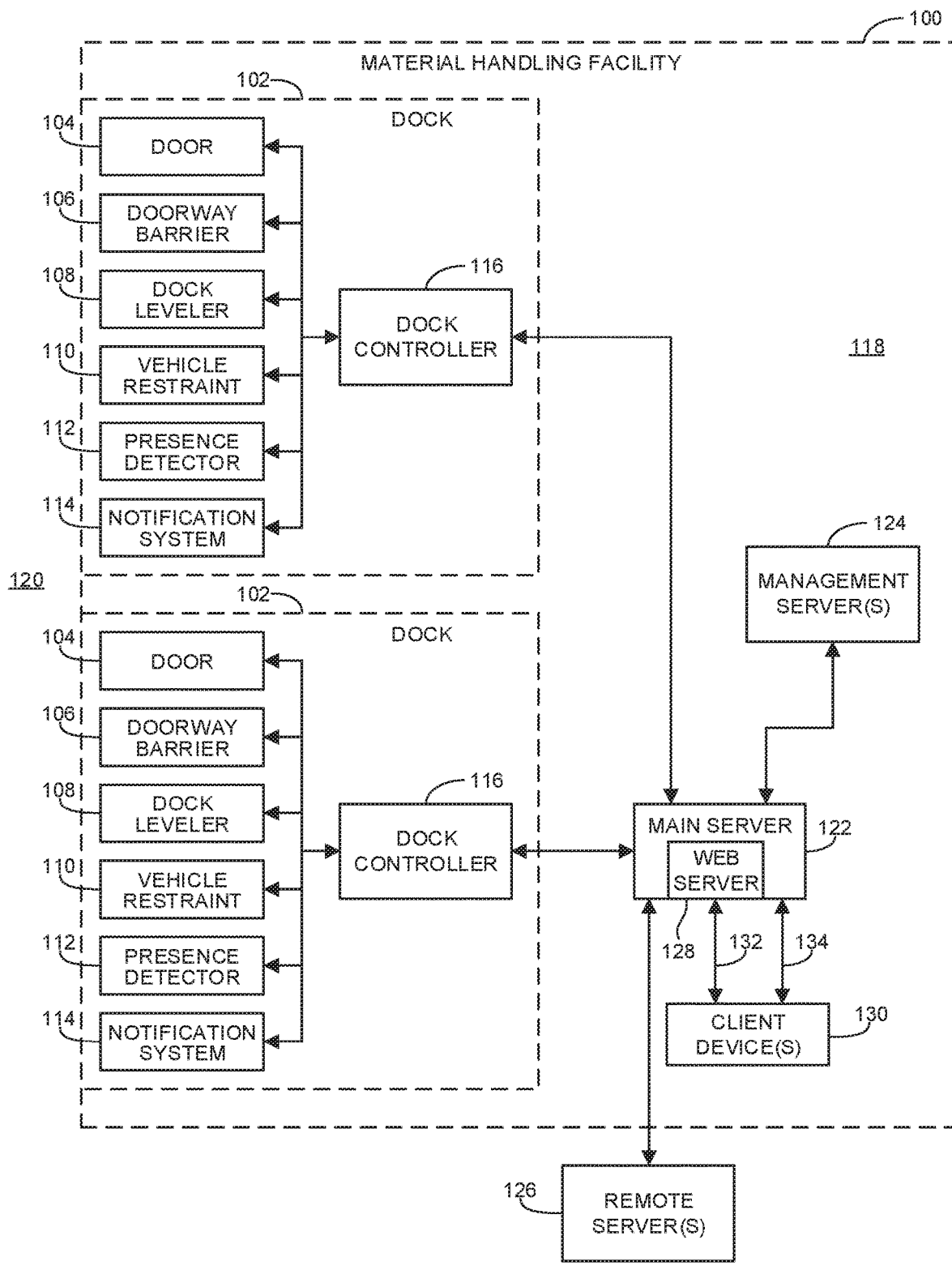
FIG. 1 illustrates an example material handling facility in which teachings disclosed herein may be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Figure 2:
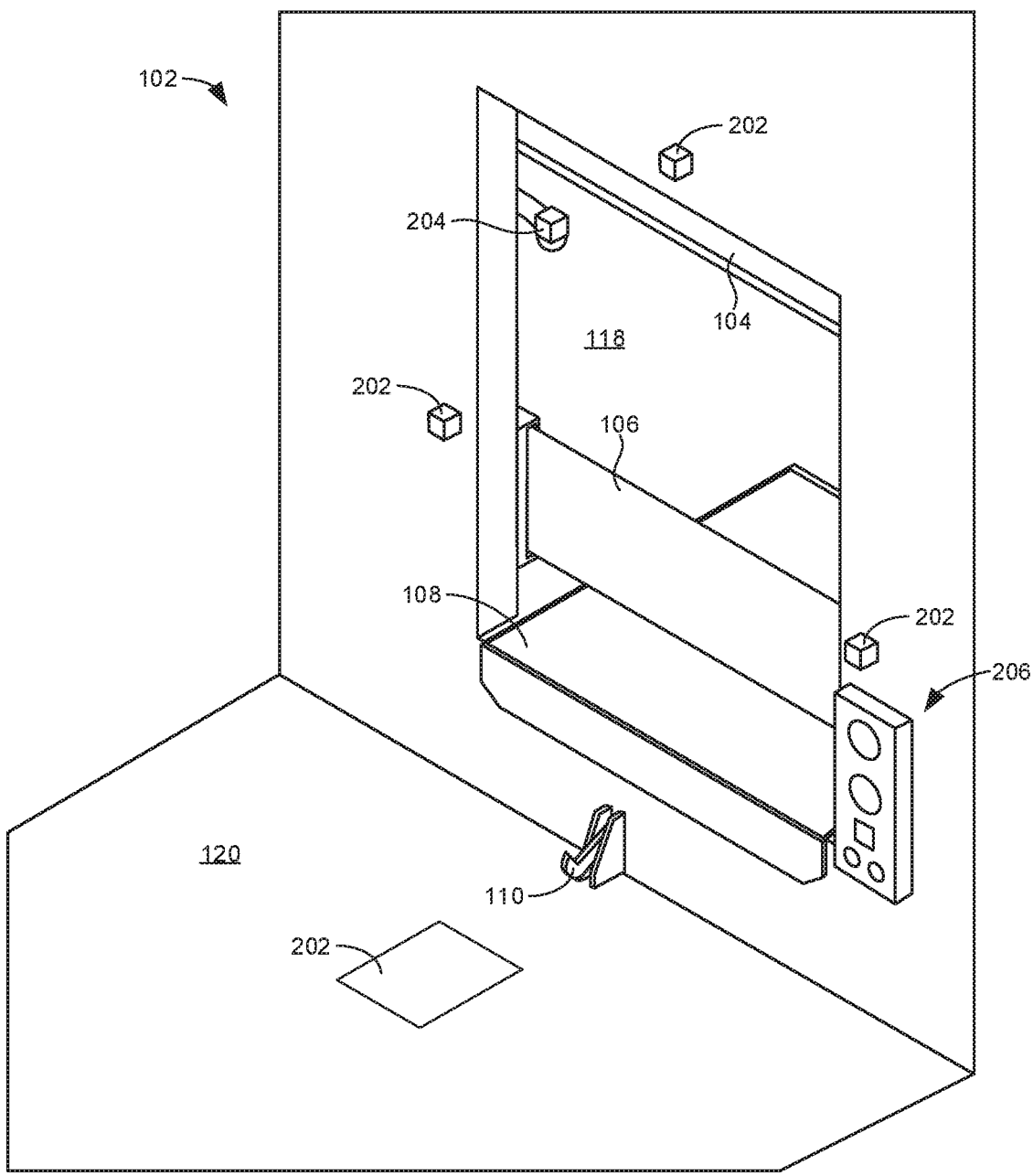
FIG. 2 illustrates the example loading dock of FIG. 1 viewed from an exterior of the material handling facility.
Figure 3:
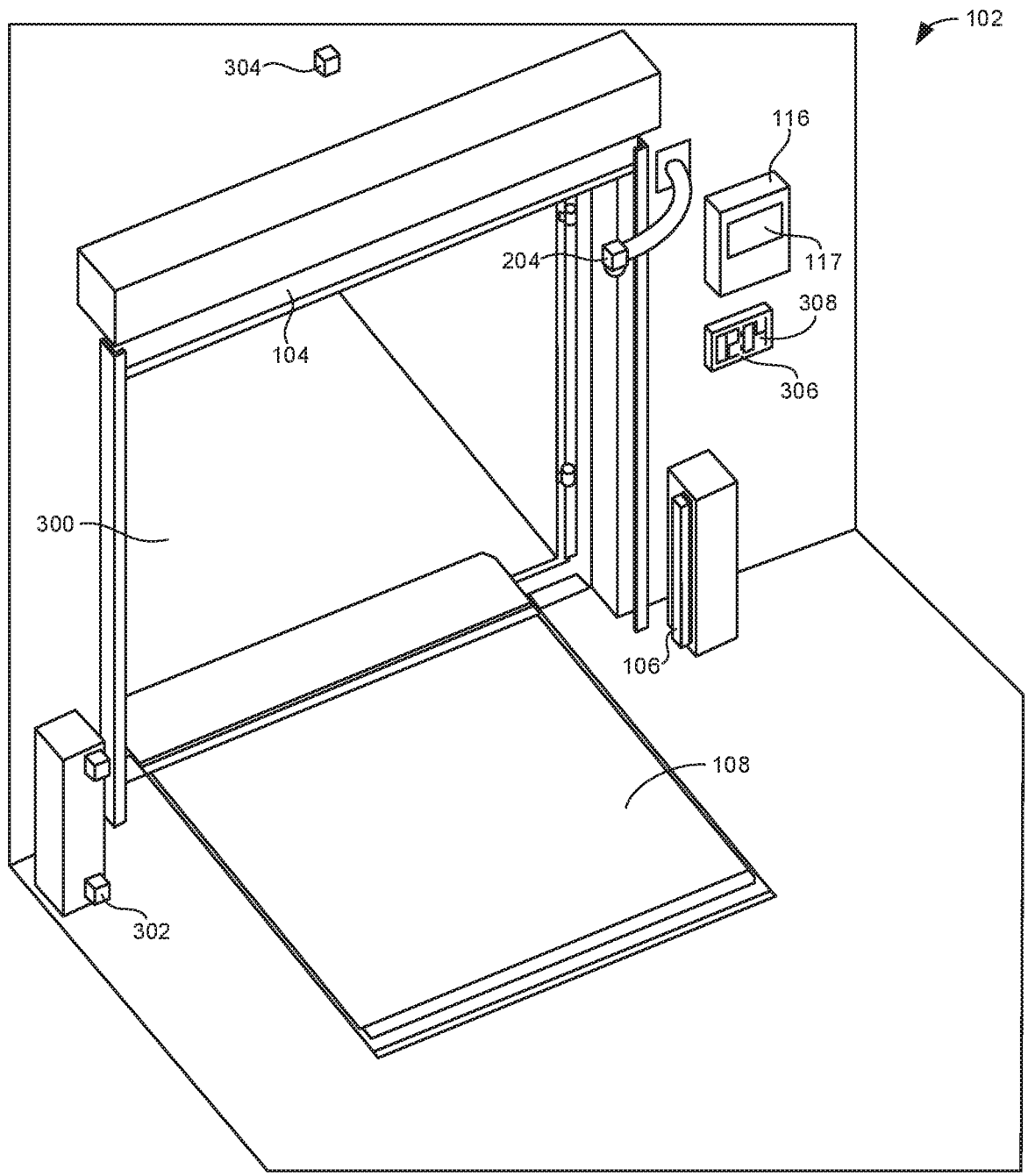
FIG. 3 illustrates the example loading dock of FIG. 1 viewed from an interior of the material handling facility with a trailer parked at the dock.
Figure 4:
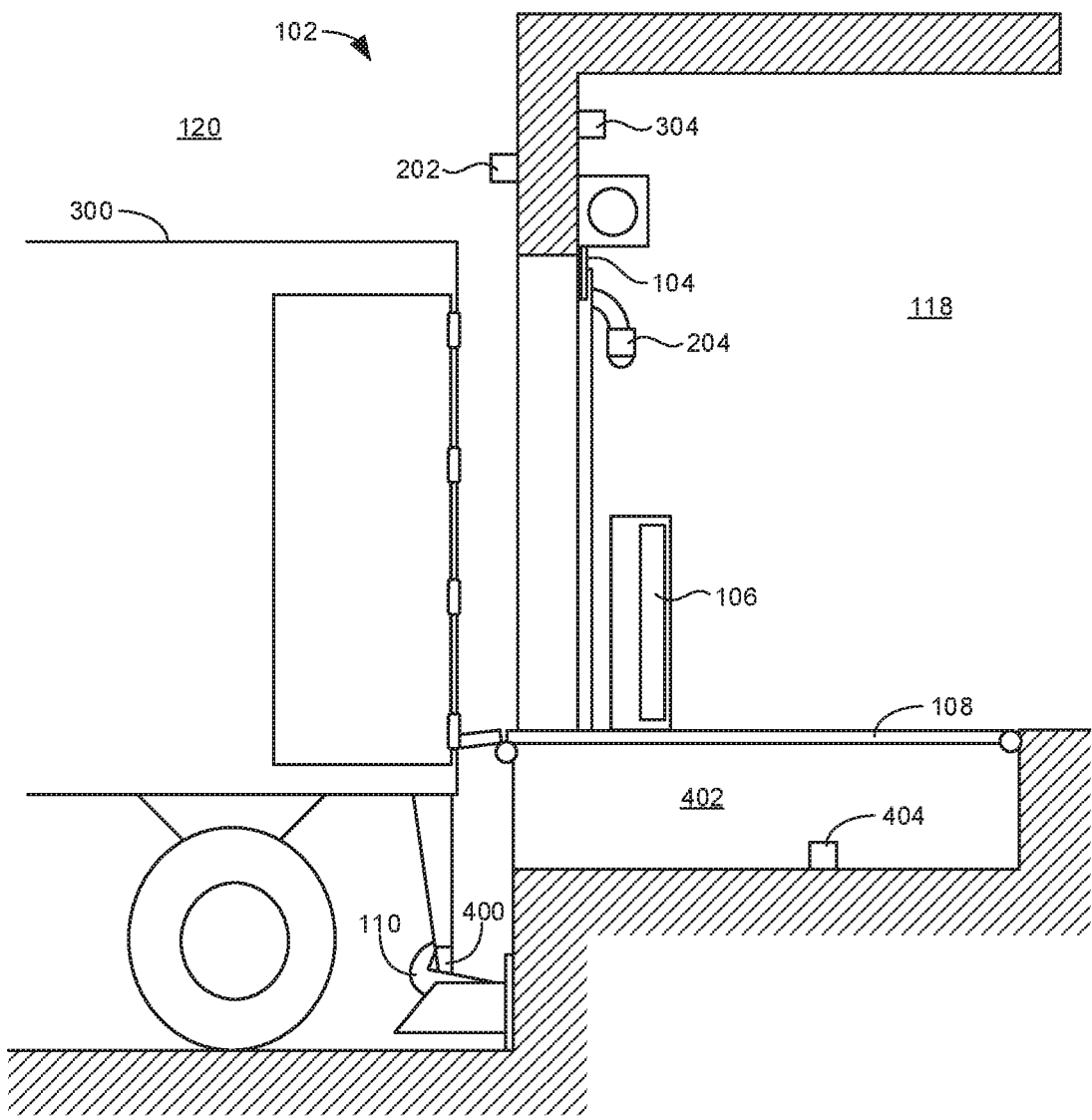
FIG. 4 illustrates a cross-sectional side view of the example loading dock of FIG. 1 with the associated trailer of FIG. 3.

FIG. 1 illustrates an example material handling facility 100 in which teachings disclosed herein may be implemented. The material handling facility 100 may be associated with, for example, a storage warehouse, a distribution center, a manufacturing plant, a retail store, etc. In the illustrated example, the material handling facility 100 includes a plurality of loading docks 102 (two are shown) providing platforms for trucks to back up a trailer (or truck bed) to enable the loading and/or unloading of materials between the inside of the trailer and the material handling facility 100. FIG. 2 illustrates an example loading dock 102 viewed from an exterior of the material handling facility 100. FIG. 3 illustrates the example loading dock 102 viewed from an interior of the material handling facility 100 with a trailer 300 parked at the dock 102. FIG. 4 illustrates a cross-sectional side view of the example loading dock 102 with the associated trailer 300. As shown in FIGS. 1-4, the example dock 102 includes a door 104, a doorway barrier 106, a dock leveler 108, a vehicle restraint 110, a presence/motion detector 112, and/or a notification system 114. In some examples, the docks 102 may be associated with and/or include other equipment such as, for example, fans, lights, door seals, shelters, trailer stands, etc. In the illustrated example, each of the docks 102 include a dock controller 116 to monitor and/or control the operation of the corresponding door 104, the corresponding doorway barrier 106, the corresponding dock leveler 108, the corresponding vehicle restraint 110, the corresponding presence/motion detector 112, the corresponding notification system 114 and/or other equipment associated with the dock. In some examples, the dock controller 116 includes a display screen 117 to display information associated with the components being monitored and/or controlled by the controller 116. The display screen 117 may be a touchscreen in which a user may also input commands and/or instructions to operate the controller and/or access specific information associated with the controller, the dock, or the operations involving the dock. In some examples, the display screen 117 may be incorporated into a different device that is separate from but in communication with the dock controller 116. Although a single controller 116 is shown as controlling all equipment associated with the dock 102, in some examples, each dock 102 may be associated with multiple controllers configured to control and/or monitor different ones of the door 104, the doorway barrier 106, the dock leveler 108, the vehicle restraint 110, the presence/motion detector 112, the notification system 114 and/or other equipment associated with the dock.

The doors 104 associated with the docks 102 are moveable between open and closed positions to selectively unblock or close off a doorway between an interior 118 of the material handling facility 100 and an exterior environment 120. Thus, when the trailer 300 or a truck bed is parked at the dock 102, the door 104 provides access to the trailer when the door 104 is in the open position and prevents such access when in the closed position.

In some examples, the doors 104 are associated with one or more sensors and/or door monitoring systems to facilitate the monitoring and/or control of the operation of the doors 104. For example, one or more door status sensors may monitor and/or detect a status of the door 104 (e.g., whether the door is fully open, fully closed, partially open, partially closed, opening, or closing); one or more impact sensors may monitor and/or detect when the door 104 has been struck (e.g., by a material handling vehicle (e.g., a forklift)); one or more photoelectric eyes arranged on either side of the door 104 may monitor and/or detect the passage of a person or object through the doorway when the door is open; one or more motion and/or presence sensors may monitor and/or detect activity in an area proximate the doorway; one or more radio frequency identification (RFID) sensors may monitor and/or detect the identity of personnel, equipment, and/or material passing through the doorway; one or more temperature sensors may monitor and/or detect the temperature on one or both sides of the door 104; one or more airflow sensors may monitor and/or detect the flow of air passing the door 104 (e.g., air passing through the door when in an open or partially open position and/or air leaking passed the door when in the closed position closed); one or more other environmental sensors may monitor and/or detect pressure, humidity, pollutants, particulates, chemicals, etc.; one or more actuator sensors may monitor and/or detect the energy consumption and/or operation of a door actuator (e.g., a motor) used to open and/or close the door; and one or more image and/or video sensors (e.g., a camera) may be implemented to monitor and/or detect particular states of the dock based on image/video analysis. In some examples, the dock controller 116 receives output signals from these sensors to monitor and/or control the operation of the door 104.

In some examples, the doorway barrier 106 is constructed to provide a barrier that extends across the doorway associated with the door 104. The doorway barrier 106 may block passage through the doorway even when the door 104 is in the open position. The doorway barrier 106 may be used in this manner as a safety precaution when, for example, the door 104 is open but there is no trailer parked at the dock 102 as shown in FIG. 2 or when a trailer at the dock 102 is not restrained. The doorway barrier 106 may also extend across the doorway in front of the door 104 within the interior 118 of the material handling facility 100 when the door 104 is closed to protect the door 104 by reducing the likelihood of material handling equipment colliding with the door 104. In some examples, the doorway barrier 106 is associated with a barrier sensor 302 (FIG. 3) that outputs a signal to the dock controller 116 to indicate a status of the doorway barrier 106 (e.g., whether the barrier is in active use and blocking the doorway (as shown in FIG. 2), stowed away to provide passage through the doorway (as shown in FIGS. 3 and 4), or in some intermediate state). In some examples, the barrier sensor 302 and/or a different sensor detects an impact (e.g., a force) on the barrier 106 that may indicate a collision with the barrier.

Often, when a truck bed or trailer (e.g., the trailer 300 shown in FIGS. 3 and 4) is parked at the dock 102, there may be a gap between the rear edge of the truck bed or trailer and the outside face of the platform of the dock 102. The dock leveler 108 provides an adjustable bridge to span this gap over which material handling equipment can travel between the interior 118 of the material handling facility 100 and the trailer of the vehicle parked at the dock 102. Furthermore, the dock leveler 108 may be vertically adjustable to act as a ramp that accounts for trailers that have different heights relative to the platform of the dock 102. In some examples, the dock leveler 108 includes one or more sensors to facilitate the monitoring and control of the operation of the dock leveler 108. For example, a leveler sensor may produce an output signal indicative of when the dock leveler 108 is in an active state (extended to bridge the gap between the dock platform and a trailer as shown in FIGS. 3 and 4), an inactive state (when the leveler is in a stored position as shown in FIG. 2), or in some intermediate state. In some examples, a trailer being pulled away from the dock 102 while the dock leveler 108 is in an active state is detected by a limit switch (e.g., detecting the leveler dropping when the extended end is no longer supported by the trailer). In such examples, an output of the limit switch may trigger the dock controller 116 to cause the dock leveler 108 to retract to the stored position of the inactive state.

The vehicle restraint 110 associated with each dock 102 is positioned in the exterior environment 120 to engage some part of the vehicle (e.g., the trailer 300) parked at the dock 102 to reduce inadvertent movement of the vehicle (e.g., by the vehicle shifting as a result of material handling equipment moving around within the trailer and/or by a driver prematurely driving away from the platform). In some examples, the vehicle restraint 110 engages a rear impact guard (e.g., an ICC bar 400 as shown in FIG. 4) of the vehicle to restrain the vehicle. In some examples, the vehicle restraint 110 engages a tire and/or any other suitable portion of the vehicle. In some examples, the vehicle restraint 110 includes one or more sensors to facilitate the monitoring and/or control of the operation of the vehicle restraint 110. For example, a restraint sensor may produce an output signal indicative of when the vehicle restraint 110 is in a locked position (e.g., in position to engage/restrain the vehicle) or an unlocked position (e.g., stored away from the vehicle). Alternatively or in addition, the restraint sensor(s) may produce an output signal indicative of the position of the restraint relative to a reference point and/or the force(s) experienced by the restraint to determine if the restraint is actively engaged/restraining the vehicle or not.

In the illustrated example of FIG. 1, the presence/motion detector 112 represents one or more presence and/or motion detector systems. In some examples, the presence/motion detector 112 includes a presence detector system to detect the presence of the trailer 300 located at the dock 102. The term "trailer" for purposes of discussion related to sensing presence or motion thereof, pertains to a trailer which may or may not be connected to a tractor or alternatively pertains to a vehicle with a cargo bay or platform. In some examples, the presence of the trailer 300 is detected via one or more trailer sensors 202 (FIG. 2) positioned in the exterior environment 120 either on and/or adjacent the building of the material handling facility 100. The trailer sensor(s) 202 may be implemented using any suitable sensors such as, for example, photoelectric eyes, proximity sensors, motion sensors, inductive loop sensors, a light detection and ranging (LIDAR) system, etc. In some examples, the presence/motion detector 112 may include a presence detector system to detect the presence of personnel/equipment (e.g., people on foot and/or driving material handling equipment, autonomous vehicles, etc.) within a trailer 300 parked at the loading dock 102 (e.g., loading and/or unloading cargo) or outside the facility on the approach of the dock 102. In some examples, the presence of personnel/equipment within the trailer 300 is detected based on a motion sensor 204 (FIGS. 2-4) facing into the trailer from a position within the material handling facility 100. Additionally or alternatively, the presence/motion detector 112 may include a presence detector system to detect the presence of personnel/equipment/materials on the platform of the leveler 108, in the leveler pit 402, and/or otherwise in close proximity to the dock 102. In some examples, the presence of personnel/equipment within the material handling facility 100 in proximity to the dock 102 is detected based on motion sensors 304 (FIGS. 3 and 4) facing the leveler 108 and/or surrounding area. Additionally or alternatively, the presence of personnel/equipment/materials may be detected within a leveler pit 402 (FIG. 4) underneath the dock leveler 108 (e.g., for levelers stored in a vertically upright position) based on one or more presence/motion sensors 404 within the leveler pit 402. In addition to detecting the presence of vehicles, personnel, or material handling equipment, any one of the presence/motion systems represented by the presence/motion detector 112 of FIG. 1 may be enabled to determine the movement (e.g., speed, direction, etc.), the position (e.g., proximity, orientation, etc.), the size, the shape, etc. and combinations thereof of vehicles, personnel, equipment, or other things (e.g., product, materials) and may be capable of differentiating between these things.

The notification system 114 of the illustrated example may include multiple separately functioning notification systems that include one or more visual indicators (e.g., lights, display screens, etc.) and/or one or more audible indicators (e.g., horns, bells, sirens, speakers, etc.) to inform personnel near the docks 102 of particular circumstances, warnings, events, and/or other conditions associated with some aspect or status of the dock 102 and/or the vehicle located at the dock. Additionally or alternatively, some of the visual indicators may be lights intended to illuminate and/or improve visibility of areas associated with the docks 102 without indicating any particular circumstance or condition associated with the docks. The visual and/or audible indicators of the notification system 114 may be located within the interior 118 of the material handling facility 100 and/or located in the exterior environment 120 outside of the material handling facility 100 depending on the purpose of the indicators.

In some examples, at least some indicators within the material handling facility are positioned and/or oriented towards the exterior environment 120 (e.g., on the end of the arm associated with the motion sensor 204 shown in FIGS. 2-4) to illuminate, be visible from, and/or heard from within an interior of a trailer parked at the dock 102 when the door 104 is open. Such indicators may provide greater visibility to personnel entering the trailer to load and/or remove cargo. Such indicators may also warn personnel within the trailer of potential safety risks such as the vehicle restraint 110 not being engaged and/or of the presence of people near the platform of the dock 102 that may not be visible from within the trailer. Other indicators within the material handling facility 100 may be positioned and/or oriented to illuminate, be visible from, and/or heard from areas within the interior 118 of the facility (e.g., at the dock platform and/or surrounding area). Some such indicators may serve as warnings of potential safety risks such as, for example, the vehicle restraint 110 not being engaged and/or of the presence of someone in the trailer that may be about to come out unexpectedly. Additionally or alternatively, the indicators may indicate the operational state of equipment associated with the dock 102.

In some examples, the notification system 114 of FIG. 1 includes a local status indicator 306 (FIG. 3) positioned adjacent the door 104 that is visible from within the material handling facility 100 to display information indicative of the status and/or progress of tasks to be performed in connection with the corresponding dock 102 and/or the particular trailer 300 at the dock. In some examples, the local status indicator 306 includes a timing indicator 308 to indicate how long a trailer has been parked at the dock 102. In this manner, personnel may be informed of how much time is left until detention and/or demurrage charges begin to accrue. In some examples, the local status indicator 306 is implemented via the display screen 117 associated with the dock controller 116. In some examples, the timing indicator 308 of the local status indicator 306 may countdown instead of count up. In some examples, the timing indicator 308 and/or other aspects of the status indicator 306 may change appearance (e.g., change color, begin flashing, etc.) and/or another indicator may be activated when the timing indicator reaches a threshold to indicate to personnel the near expiration of time related to a particular operational constraint (e.g., the need to quickly finish loading and/or unloading the trailer). In some examples, the timing indicator 308 and/or the local status indicator 306 may indicate (e.g., based on a color, flashing, etc.) a priority for loading and/or unloading a trailer at the corresponding dock 102 relative to the loading and/or unloading of other trailers at other docks 102. In some such examples, the prioritization may be based on predicted time allocation and/or predicted cost incursion across multiple docks 102 of the material handling facility 100 in light of available operational resources (e.g., personnel on hand, available material handling equipment, pick status, cross dock order status, etc.).

In some examples, one or more indicators are positioned on the outside of the material handling facility 100 to illuminate, be visible from, and/or heard from areas external to the docks 102. In some examples, such indicators may be lights that illuminate the area to provide greater visibility for people in the exterior environment 120 (e.g., a driver backing a trailer up to the dock 102). Additionally or alternatively, in some examples, the indicators may be lights that provide warnings and/or guidance to people in the exterior environment 120. For example, as shown in FIG. 2, light indicators 206 on the exterior of the facility 100 include a stop (red) and go (green) light to direct a truck driver when a trailer (e.g., the trailer 300 of FIGS. 3 and 4) may be backed into the area adjacent the dock 102 and/or when the trailer may be pulled away from the dock 102. In some examples, light and/or audible indicators can be used to indicate to a driver when a vehicle restraint is in override, dock equipment is undergoing maintenance, or there is someone/something in or near the path of the trailer, etc. These conditions may be communicated via separate indicators, utilizing different states of a common indicator (color/tone change, flashing/sounding pattern, etc.) or combinations thereof. Further, in some examples, indicators associated with the dock 102 include lights and/or audible alarms indicating to people standing near the dock approach when a truck is backing in.

In some examples, the dock controller 116 controls the different indicators associated with the notification system 114 based on one or more of the signals received from the various sensors associated with the door 104, the doorway barrier 106, the dock leveler 108, the vehicle restraint 110, and/or the presence detector 112. For instance, in some such examples, the dock controller 116 causes the light indicators 206 to provide a stop light (e.g., a red light) whenever the restraint signal indicates that the vehicle restraint 110 is active and engaged with the trailer. As another example, if the door sensor indicates the door 104 is opened when the presence detector 112 fails to detect a trailer parked at the dock 102, there is a risk that the open door may lead to a drop-off of the dock platform. Accordingly, in some such examples, the dock controller 116 may turn on a warning indicator to caution nearby individuals of the exposed drop. However, in some such examples, the dock controller 116 may not trigger the warning indicator when the barrier sensor 302 provides a signal indicating the doorway barrier 106 is in active use to block passage through the opened doorway. Thus, different signals output from different ones of the various sensors may be used in combination to trigger a change in the activation or state of indicators associated with the notification system 114 to provide warnings, notifications, and/or guidance to people in areas associated with the dock 102.

In the illustrated example of FIG. 1, each of the dock controllers 116 associated with the different docks 102 communicate with a main server 122. Although the main server 122 is shown as being located within the material handling facility 100 in the illustrated example, in other examples, the main server 122 may be remotely located away from the material handling facility 100. In some examples, the main server 122 may be integrated with and/or implemented by one of the dock controllers 116.

In some examples, the dock controllers 116 transmit values corresponding to the operational and/or state parameters controlled and/or monitored by the controllers 116, which may be based on feedback from one or more of the door 104, the doorway barrier 106, the dock leveler 108, the vehicle restraint 110, the presence detector 112, the notification system 114, and/or sensors associated with any of the above. In this manner, the main server 122 aggregates all available data associated with the different docks 102 in the material handling facility 100 into one place. The aggregation of data from the disparate sources enables the main server 122 to analyze and/or integrate the controller data to identify relationships that would not otherwise be possible. As described more fully below, in some examples, the main server 122 organizes the aggregated controller data for presentation to end users via one or more dashboards or graphical user interfaces (GUIs) directed to particular interests of the end users. The GUIs may be presented by one or more web pages, apps, applets, applications, etc.

In some examples, the graphical user interfaces may be configurable to provide substantially real-time (e.g., less than a 5 second delay) information regarding the operations of one or more of the docks 102. More particularly, in some examples, the graphical user interfaces may provide indications of the progress and timing of advancement through sequences of operation associated with the arrival, parking, loading, unloading, and/or departure of a truck and/or trailer at a particular dock 102. Providing substantially real-time information regarding the timing of tasks associated with a trailer to be loaded or unloaded at a dock can enable a dock manager or other personnel to manage/coordinate the work associated with a particular trailer to ensure it does not take more than a scheduled or allotted amount of time for work on the trailer. For instance, a typical amount of time given for a trailer to be loaded or unloaded is 2 hours. In many instances, if the loading and/or unloading of the trailer takes more than 2 hours, detention and/or demurrage charges may be incurred.

While a majority of the 2 hours (or other amount of time) allotted to a trailer typically involves the movement of cargo into or out of the trailer, there are other tasks to be performed both before and after the cargo is moved that can also contribute to the duration of time a trailer remains at a particular dock 102. In particular, there is a general sequence of operations or tasks associated with the arrival of a trailer before loading and/or unloading may occur. Further, after loading and/or unloading of a trailer is complete, there is another general sequence of operations or tasks associated with the departure of a trailer. Thus, the tasks or operations associated with the work to be performed in connection with a trailer 300 at a dock 102 (generally referred to herein as a loading/unloading process) may be divided into three general categories or phases including an arrival phase, a material handling phase, and a departure phase.

In some examples, the arrival phase involves a sequence of operations including the arrival of a driver with the trailer 300 at the facility 100, followed by the driver checking in to be directed to a particular dock 102, followed by the positioning of the trailer 300 at the dock 102, followed by the activation of the vehicle restraint 110, followed by the opening of the dock barrier 106, followed by the opening of the dock door 104, followed by the activation (e.g., extension) of the dock leveler 108. In some examples, one or more of the above operations may be omitted from the full sequence (e.g., arrival and check-in of a driver if the trailer is already onsite) and/or one or more of the above operations may be performed in a different order (e.g., opening the door 104 before opening the doorway barrier 106). In some examples, the order of operations in the above sequence is enforced by the controller 116 (e.g., an interlock). For example, if the vehicle restraint 110 is not engaged with the trailer 300, the controller 116 may prevent the dock door 104 from opening. Similarly, if the dock door 104 is not open, the controller 116 may prevent the leveler 108 from being activated.

In some examples, the departure phase includes substantially similar tasks to the arrival phases except that they are performed in the reverse order. That is, in some examples the departure phase includes the deactivation (e.g., storage) of the dock leveler 108, followed by the closing of the dock door 104, followed by the closing of the dock barrier 106, followed by the disengagement of the vehicle restraint 110, followed by the trailer being pulled away from the dock 102, followed by the driver checking out, followed by the trailer departing from the facility. As with the arrival phase, in some examples, one or more of the tasks in the sequence of operations for the departure phase may be omitted from the full sequence and/or one or more of the tasks may be performed in a different order. Further, in some examples, the order of operations in the above sequence is enforced by the controller 116.

Between the arrival phase and the departure phase is the material handling phase. The material handling phase involves the loading and/or unloading of materials in the trailer. In some examples, the material handling phase involves the majority of the time the trailer remains at the material handling facility 100. That is, in some examples, the material handling phase is longer than both the arrival phase and the departure phase. The particular duration of the material handling phase depends on the size of the load (e.g., number of pallets) to be moved. Furthermore, the duration of the material handling phase can change depending on the number of personnel working to load and/or unload the trailer 300. For example, two workers are likely to be able to move a set amount of cargo in approximately half the time it would take one worker to do so when alone.

While the material handling phase typically takes more time than either the arrival phase or the departure phase, each task in the sequence of operations associated with the arrival phase and the departure phase still takes some amount of time. Many such tasks are mechanical in nature (e.g., engaging/disengaging the vehicle restraint 110, opening/closing the door 104, extending/retracting the leveler 108, etc.). As such, the duration of individual tasks in the arrival and departure phases are often relatively predictable and consistent. However, such tasks typically need to be initiated by a person working at the dock 102. As a result, there may variability in the time between the completion of one task and the initiation of a subsequent task in the sequence of operations that can add up to an appreciable amount of time. Delays in initiating and/or completing a particular task in the sequence of operations for the arrival and departure phases may occur because the person designated to accomplish the task is busy performing some other responsibility, runs into a problem associated with the task that requires correction (e.g., a malpositioned trailer, an equipment malfunction, etc.), and/or is distracted and/or detained for any other reason. Such delays can reduce the time available to load and/or unload a trailer 300 during the material handling phase, thereby increasing the possibility for detention and/or demurrage charges.

Some examples disclosed herein monitor the duration and/or timing of tasks associated with each of the arrival phase, the material handling phase, and the departure phase in substantially real-time. In some examples, such timing information is presented to a dock manager or other personnel via GUIs to enable the dock manager to identify when the unloading and/or loading of a particular trailer is on track to be completed in a timely manner or when delays have caused the loading and unloading to fall behind schedule. In some examples, the duration and/or timing of the different tasks being monitored in substantially real-time are compared against target threshold time periods for the individual tasks and/or for groups of two or more of the tasks. In some such examples, both the real-time timing information as well as the target threshold time periods are represented on the GUIs to facilitate the dock manager or other personnel in acquiring a sense of how far behind schedule a particular trailer may be as well as what task(s) may have contributed to such delays. Similarly, the GUIs may assist personnel in determining when the work at a particular dock 102 associated with a particular trailer is on or ahead of schedule.

Additionally or alternatively, in some examples, the timing indicator 308 located at the dock 102 provides an indication of the duration of time that has passed since a specified start time and until a particular task is initiated or completed. In some examples, the start time for the timing indicator 308 corresponds to the completion of a task (e.g., the previous task) and/or the initiation of a task (e.g., the previous or current task) in the specified sequence of operations and the task to be completed is the next task in the sequence of operations. For example, the opening of the dock door 104 (e.g., the door 104 being activated to open or the door reaching its open limit switch) may trigger the timing indicator 308 to begin counting up to show how much time has passed until the dock leveler 108 is to be positioned to enable loading and unloading of the trailer 300. In some such examples, positioning the dock leveler 108 (e.g., the start or cessation of the dock leveler 108 activation) triggers the timing indicator 308 to restart counting to provide an indication of the time that has passed since the trailer first became available for loading and unloading. Thus, in some examples, the timing indicator 308 may restart in response to the completion of each task and continue to count until the next scheduled task is initiated or completed. In other examples, the timing indicator 308 may be initiated and/or reset based on some trigger other than the initiation and/or completion of particular tasks (e.g., based on a user input and/or some other event). For purposes of explanation, the examples described in detail are provided with respect to the completion of particular tasks. Providing such a counter at the location of the dock 102 enables personnel at the dock to quickly and easily determine whether the sequence of operations are being timely progressed through or if there has been a delay associated with a particular task. In some examples, the display of the timing indicator 308 may change appearance (e.g., change color, begin flashing, etc.) when the elapsed time exceeds a target threshold corresponding to the particular task to indicate that the task is taking longer to complete than expected.

In other examples, rather than counting up to represent elapsed time, the timing indicator 308 may countdown to represent the amount of time remaining until the next task is expected to be initiated or completed. For example, assume that a target threshold window of 3 minutes is given to extend the dock leveler 108 following the opening of the door 104. In such examples, once the door 104 is opened, the timing indicator 308 is triggered to begin counting down from 3 minutes. In this manner, personnel at the dock 102 can quickly and easily determine how much time they have left until the next task needs to be initiated or completed (e.g., activating the leveler 108 in this example) to remain on schedule. In some examples, the countdown may change appearance (e.g., change color, begin flashing, etc.) when the countdown reaches zero and/or when the countdown reaches a time limit near zero. In some examples, if the relevant task has still not been initiated or completed once the time reaches zero, the timing indicator 308 may begin counting up to represent how much time has elapsed since the relevant task was expected to be initiated or completed based on the target threshold designated for the task.

In some examples, the counting down or counting up of the timing indicator 308 may correspond to more than one task. For instance, in some examples, a threshold period of time may be defined for all tasks in the arrival phase following the positioning of the trailer 300 at the dock 102 until the dock leveler 108 is in position to enable the commencement of the material handling phase. In such examples, as soon as the trailer 300 is detected at the dock 102, the timing indicator 308 begins counting (either up or down) and continues to count until the dock leveler 108 is extended to an activated position. The timing indicator 308 may be configured to provide timing information for any other grouping of the tasks described above.

In some examples, in addition to displaying timing information (e.g., countdown or elapsed time), the local status indicator 306 may also provide an indication of the task(s) that need to be completed in connection with the timing information. In some examples, this indication includes an audible prompt, text identifying the last task to be completed within the relevant time period, and/or an icon representative of such a task. Thus, if each new task is associated with a separate timing threshold and independently timed by the local status indicator 306, each time the timing indicator 308 of the local status indicator 306 restarts (based on the initiation or completion of a previous task), the local status indicator 306 also updates to include an audible prompt, an icon, image, and/or text identifying the next task to be initiated or completed. By contrast, if the timing threshold corresponds to a series of multiple tasks, the local status indicator 306 may include an audible prompt, an icon, image, and/or text identifying the last task in the series. In such examples, personnel viewing the local status indicator 306 would be expected to know what intervening tasks need to be performed before completing the final task designated on the local status indicator 306. In other examples, the local status indicator 306 may identify the next task to be performed, the final task in the series, and/or all intervening tasks. Additionally or alternatively, in some examples, the local status indicator 306 may also identify completed tasks or a subset of completed tasks (e.g., the last task completed). In some examples, the local status indicator 306 may display include multiple timers corresponding to different tasks and/or sequences of a group of tasks to be completed. As one particular example, a first timer may indicate the time until the next particular task during the arrival phase is to be initiated or completed, a second timer may indicate the time until the arrival phase is to be completed and/or the time until the material handling phase is to be initiated, and a third timer may indicate the total loading/unloading time for the particular trailer currently at the dock 102. In some examples, two or more the multiple timers may be displayed simultaneously alongside each other. In other examples, different ones of the multiple timers may be displayed during distinct periods of time (e.g., the local status indicator 306 may cycle between each of the timers one at a time).

Figure 5:
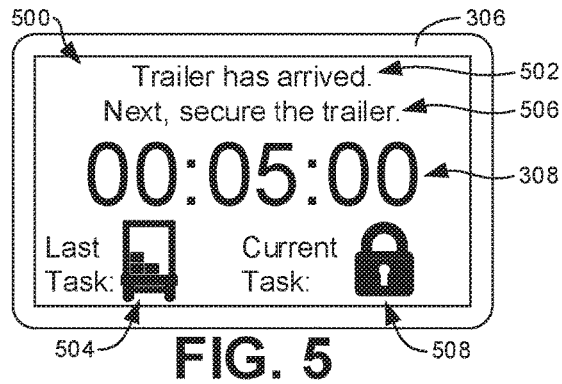
FIGS. 5-12 illustrate example user interfaces that may be provided via the local status indicator of FIG. 3 as successive tasks in the sequence of operations associated with the loading and/or unloading of a trailer at a particular dock are completed.
Figure 6:
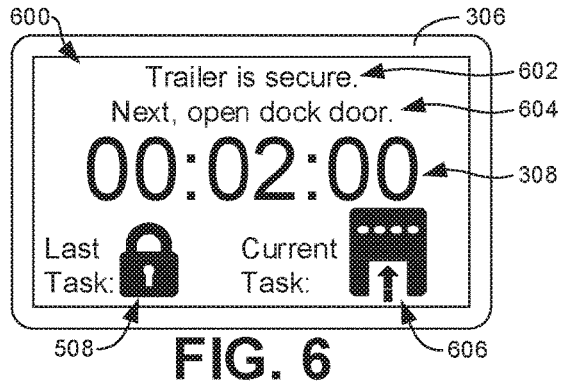

As a specific example, FIGS. 5-12 illustrate example user interfaces 500, 600, 700, 800, 900, 1000, 1100, 1200 that may be provided via the local status indicator 306 during successive tasks in the sequence of operations associated with arrival phase, the material handling phase, and the departure phase of a loading/unloading process for a particular trailer 300. In this example, the first user interface 500 shown in FIG. 5 is triggered in response to detecting the presence of the trailer 300 at the corresponding dock 102. In some examples, confirmation of the presence of the trailer 300 at the dock 102 may be provided by a text-based trailer present confirmation 502 and/or by a trailer present icon 504. Further, in some examples, the next (e.g., current) task to be completed may be indicated, which is to secure the trailer by engaging the vehicle restraint 110. In some examples, the activation or engagement of the vehicle restraint 110 as the next task to be completed is indicated in the user interface 500 by a suitable text-based notification 506 and/or a restraint lock icon 508. In some examples, the timing indicator 308 is initiated to count up or count down with respect to a threshold (i.e., target) time period designated for securing the trailer 300 with the vehicle restraint 110 (e.g., 5 minutes in the illustrated example).

Figure 7:
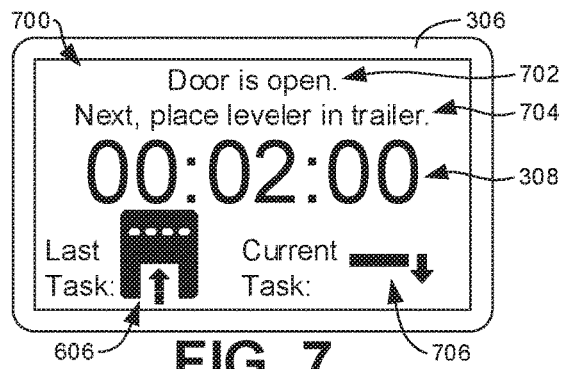

Once a sensor associated with the vehicle restraint 110 indicates the trailer 300 is secure, the local status indicator 306 updates to a second user interface 600 that includes a trailer secure confirmation 602 and/or the restraint lock icon 508 to indicate the task has been completed. Further, in this example, a new text-based notification 604 and/or a door open icon 606 is provided to identify that the next/current task to be completed is the opening of the dock door 104. Additionally, in this example, in response to the vehicle restraint 110 being engaged to secure the trailer 300, the timing indicator 308 is reset corresponding to a new threshold period of time designated for the task of opening the door 104 (e.g., 2 minutes in the illustrated example). A similar user interface 700 is shown in FIG. 7 after the door has been opened with a text-based notification 702 and/or the door open icon 606 to indicate the door 104 has been opened and a separate notification 704 and/or an engage leveler icon 706 to indicate the next/current task to be completed is to place the dock leveler 108 in the trailer 300.

Figure 8:
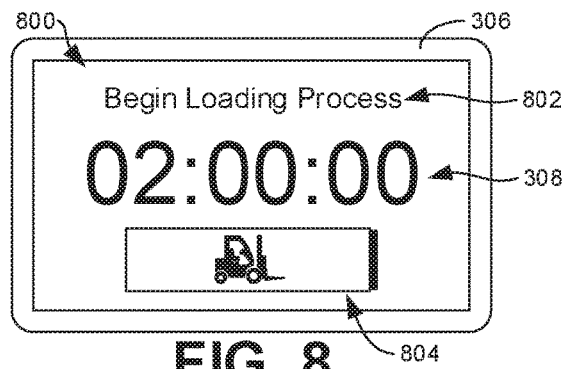
Figure 9:
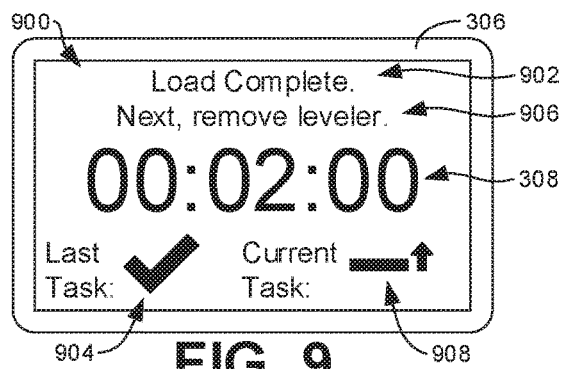
Figure 10:
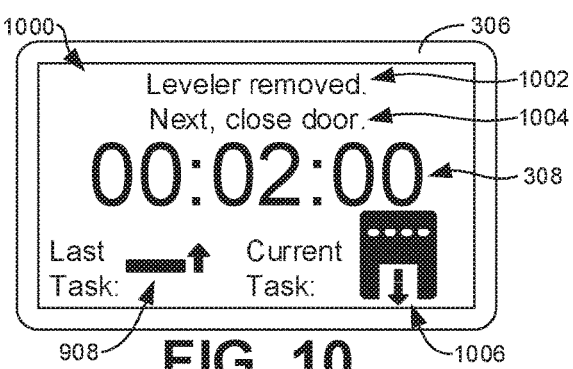
Figure 11:
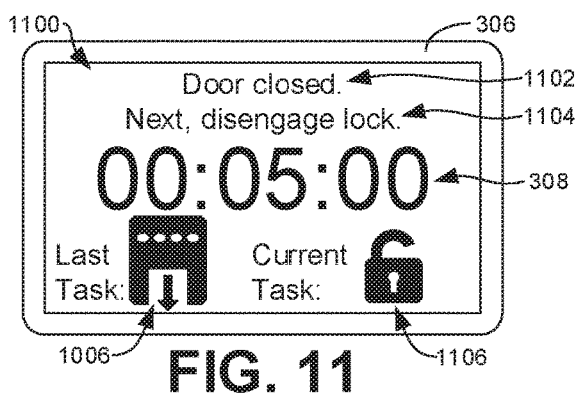
Figure 12:
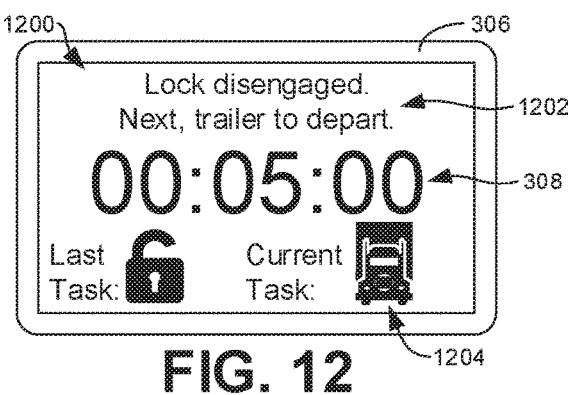

Once the dock leveler 108 has been confirmed to be extended into the trailer 300, the arrival phase has completed and the activity associated with the dock moves to the material handling phase. FIG. 8 illustrates an example user interface 800 displayed by the local status indicator 306 during the material handling phase. In this example, both a text-based notification 802 and a trailer activity icon 804 are provided to indicate the current task at hand is to load and/or unload the trailer 300. Further, as shown in the illustrated example, the timing indicator 308 is again reset to a designated threshold period (e.g., 2 hours in this example) allocated for completion of the material handling phase of the loading/unloading process. In some examples, the entire period from when the trailer 300 is detected as being present at the dock (FIG. 5) until the trailer 300 pulls away from the dock 102 (FIG. 12) may have an overall threshold time period of 2 hours. In such examples, the threshold period specific to the material handling phase (the progress of which is represented in FIG. 8) would be reduced accordingly. In some examples, the user interface 800 of FIG. 8 associated with the material handling phase may include additional information about the particular trailer being loaded and/or unloaded. For example, the user interface 800 may indicate the number of load units (e.g., pallets) to be moved. In some examples, the user interface 800 may indicate the number and/or timing of individual trailer activity events detected as determined by the motion sensor 204 each time motion is detected within the trailer 300.

Once the loading and/or unloading of the trailer 300 is completed, the departure phase begins and the sequence of operations performed during the arrival phase is reversed with similar user interfaces provided for each separate task. For example, the user interface 900 of FIG. 9 includes a text notification 902 and a load complete icon 904 to indicate the completion of the loading and/or unloading of the trailer 300 has been confirmed. Further, in some examples, the user interface 900 includes a separate notification 906 and/or a disengage leveler icon 908 to indicate the next/current task to be performed along with the timing indicator 308 being reset based on the associated threshold time period. The user interface 1000 of FIG. 10 includes a text notification 1002 and the disengage leveler icon 908 to indicate the dock leveler 108 has been removed from the trailer 300. Further, in some examples, the user interface 1000 includes a separate notification 1004 and/or a close door icon 1006 to indicate the next/current task to be performed along with the timing indicator 308 being reset based on the associated threshold time period. The user interface 1100 of FIG. 11 includes a text notification 1102 and the close door icon 1006 to indicate the door 104 has been closed. Further, in some examples, the user interface 1100 includes a separate notification 1104 and/or a restraint unlock icon 1106 to indicate the next/current task to be performed along with the timing indicator 308 being reset based on the associated threshold time period. Once the vehicle restraint 110 is unlocked (e.g., disengaged), the timing indicator 308 may again be reset based on a threshold time associated with the expected time for the trailer 300 to leave the dock 102. Similar text-based notifications 1202 and/or a trailer depart icon 1204 may be provided to give context for the timing indicator 308.

As mentioned above, the user interfaces 500-1200 of FIGS. 5-12 are displayed by the local status indicator 306 located at a corresponding dock 102 to provide information regarding the progress of the work to be completed at the dock 102. In some examples, the same information may be provided to other personnel remotely located from the dock 102 (e.g., a dock manager or other personnel located in another part of the facility 100) via a GUI generated by the main server 122 described further below. Additionally or alternatively, in some examples, the GUIs provided by the main server may provide other information based on the aggregation of data from the different docks 102 in the facility 100 and/or other types of data. Furthermore, in some examples, the main server 122 not only aggregates data in substantially real-time to provide substantially real-time information about the status, timing, and/or progress of activity at different docks, the main server also archives such data for subsequent display to personnel after appropriate processing and analysis. That is, in some examples, as tasks associated with activity at a dock 102 are monitored by the dock controller 116 and reported to the main server 122, the main server 122 may archive such data with an associated timestamp from which the duration and/or timing of each task may be retrieved for later review and/or analysis. In some examples, the timestamp may correspond to the initiation of a particular task, a completion of a particular task, and/or the trigger of a sensor indicating some action associated with a particular task and/or operation relating to the dock 102.

In some examples, the threshold (i.e., target) period of time specified for each task and/or group of tasks are based on an analysis of the historical timing information. For example, a threshold time period allocated for extending the dock leveler 108 after the door 104 has been opened may be designated to correspond to the average amount of time it took to complete such a task each time a trailer was loaded or unloaded at the corresponding dock over some specified period of time in the past (e.g., one week, one month, one year, etc.). In some examples, the threshold period of time may be based on the average amount of time for the task as measured across multiple or all of the docks 102 in the material handling facility 100 over a time frame. In some examples, the threshold period of time may be based on the average amount of time for the task as measured across docks at multiple different facilities over a time frame. In some examples, the threshold period of time may be defined based on a statistical metric other than the average such as the minimum, maximum, and/or median (potentially taking into account some variance) of the amount of time taken for the relevant task to be performed in connection with the relevant docks (a single particular dock, a particular group of docks, all docks at a facility, docks at multiple facilities, etc.). In some examples, the historic timing information associated with performing tasks associated with activity at a dock are reviewed periodically (e.g., every 30 days, every 60 days, every 90 days, etc.) to prompt a user to, to recommend, or to automatically update the target threshold periods of time. In some examples, artificial intelligence is implemented to analyze the data to determine suitable adjustments to the target threshold periods of time based on the most recently collected historical data (e.g., indicating improvements in efficiencies of certain tasks and/or tasks where efficiency is slipping).

In some examples, the target threshold periods of time may be defined independent of historical timing information. For example, the target threshold period of time may be based on industry benchmarks independent of the historically archived data. In some examples, the target threshold period of time is defined by a user (e.g., manually input).

Beyond providing the basis for setting suitable target threshold periods of time to enable the substantially real-time tracking of the progress of tasks associated with the loading and unloading of a trailer, the historical timing information for such tasks may also be used to reduce the frequency and/or impact of delays that may occur. For example, an analysis of historical timing data over an extended period of time may reveal certain trends showing that the time to perform a particular task exceeds the corresponding target threshold more often than other tasks. Such trends may reveal the need to provide training on the particular task to reduce the recurring delays. In some examples, an analysis of the historical timing data may reveal that one or more particular docks 102 in the facility 100 are associated with detentions more frequently than other docks 102 in the facility 100. In such examples, the circumstances of the less efficient docks may be analyzed to make suitable adjustments to improve efficiency. Other types of inefficiencies may be identified through an analysis of the historical data to determine when (e.g., times, shifts, days, etc.) and where (e.g., shipping or receiving, docks assigned to specific workers) delays often arise, thereby enabling a dock manager to implement a suitable response to reduce the occurrence and/or duration of such delays in the future.

Some delays may occur that cannot be foreseen or anticipated in advance based on an analysis of historical data. However, in some examples, the historical data may nevertheless be used to reduce the impact of such delays by enabling dock managers and/or other personnel to identify delays earlier on (e.g., by identification of trends) and to reallocate resources (e.g., workers, material handling equipment, etc.) as appropriate to attempt to make up for lost time. More particularly, in some examples, the amount of resources to allocate to the loading and/or unloading of a trailer that is behind schedule may be estimated based on how long loads of similar sizes were completed in the past as represented in the historical data. Such a determination depends on having load information indicative of the size of such loads. Accordingly, in some examples, in addition to tracking and archiving timing information regarding the completion of specific tasks, load information for each trailer that is loaded and/or unloaded is also tracked and recorded. In some examples, load information includes the size of the load (e.g., number of pallets to be moved) as well as other relevant characteristics about the load (e.g., live load or dropped load, whether the load is refrigerated, the carrier associated with the load, etc.). Further, as mentioned above, the speed at which a particular trailer is loaded or unloaded may depend on the amount of resources allocated to the trailer for unloading. Accordingly, in some examples, resource allocation information is collected in connection with each trailer that is loaded or unloaded. In some examples, resource allocation information includes the number of workers assigned to a particular dock or group of docks, the identity of the workers, the time of day (particular shift), the number and/or types of material handling equipment used, how many other docks have loading or unloading activity at the same time, etc.

In some examples, delays can be avoided before they occur and/or increased efficiency can be achieved based on which docks 102 particular trailers are assigned to for loading and unloading. In many instances, the assignment of a trailer to a loading dock is often based on whether the trailer is associated with shipping or receiving. However, examples disclosed herein rely on aspects of the historical data outlined above (e.g., including timing information for different tasks at different docks, load information, resource allocation information, etc.) to enable personnel to assign particular trailers to particular docks. More particularly, in some examples, the historical data is analyzed to identify usage, utilization, and logistical characteristics of different docks. Some particular factors that may be obtained from analysis of the historical data include dock equipment utilization, carrier efficiency, number of loads completed at a particular dock in a given time frame, size of the loads, time of day (e.g., hour of the day, particular work shift, etc.), dock efficiency, personnel working at particular docks, etc. Dock equipment utilization refers to how often the equipment associated with a particular dock is used (e.g., the number of cycles). Carrier efficiency refers to the efficiency with which loads associated with a particular carrier are completed as compared with loads associated with other carriers. Similarly, dock efficiency refers to the efficiency with which loads at a particular dock are completed as compared with loads associated with other docks.

In some examples, deterministic rules and/or artificial intelligence may be implemented to determine which carriers, docks, and/or dock personnel are the most efficient and/or least efficient. In some examples, the analysis of the historical data may be updated on a regular basis to account for new data associated with additional trailers loaded and/or unloaded at the facility 100 such that the efficiencies calculated for the different carriers, docks, and/or personnel may be adjusted with changes over time. Based on such determinations, particular trailers may be automatically assigned to particular docks to improve efficiency. For example, a trailer with a small load (e.g., only one pallet) during a busy time of day may be assigned to a dock associated with relatively high efficiency and/or to personnel associated with relatively high efficiency. On the other hand, if circumstances are not as busy, smaller loads may be assigned to less efficient docks while relatively large loads are assigned to more efficient docks. As another example, carriers that are determined to be less efficient than others may be assigned to more efficient docks to offset the carrier inefficiencies. As another example, more critical loads and/or loads associated with more significant detention charges may be assigned to more efficient docks. In some examples, docks are assigned based on their equipment utilization (equipment cycles) such that the utilization of equipment is relatively consistent across different docks, thereby reducing the overuse and/or premature wearing of equipment associated with particular docks. Alternatively, in some examples, equipment utilization may be concentrated among a subset of docks within the facility so that servicing and/or replacement of equipment for different groupings of docks is spread out over time.

In the illustrated example of FIG. 1, the main server 122 may communicate with one or more remote server(s) 126 that are not located at the material handling facility 100. In some examples, the remote server(s) 126 correspond to additional servers, comparable to the main server 122, that are located at other material handling facilities and/or other locations associated with the business enterprise operating the material handling facility 100 of FIG. 1. Additionally or alternatively, in some examples, the remote server(s) 126 may correspond to a server maintained by a manufacturer of equipment associated with one or more of the docks 102.

In the illustrated example of FIG. 1, the material handling facility 100 includes one or more management server(s) 124 that facilitate the management of various aspects of the equipment assets and/or working operations of the material handling facility 100. In some examples, the management server(s) 124 communicate with the main server 122 via a bus, local area network (LAN), and/or a wide area network (e.g., the Internet). The example management server(s) 124 may include a dock/yard management system, an inventory control system, a video management system (VMS), a warehouse management system (WMS), an enterprise resource planning (ERP) system, etc. Additionally or alternatively, in some examples, one or more of the management servers may be combined with and/or implemented by the main server 122.

In some examples, the main server 122 includes and/or is associated with a web server 128 that hosts one or more web pages accessible by a user via a client device 130. Client devices 130 may be any suitable computing device with a browser to access the web pages hosted by the web server 128. Thus, the client devices 130 may correspond to one or more operator stations located at the material handling facility (e.g., in the logistics office of the facility). In some examples, the client devices may be portable devices (e.g., tablets, smartphones, etc.) carried by personnel throughout the material handling facility 100 and/or remotely away from the facility. Further, some client devices 130 may be portable devices used by truck drivers hauling trailers to or from the material handling facility 100 and/or yard jockeys who reposition trailers at the docks 102 and/or within the yard of the material handling facility 100.

The different web pages may include different GUIs designed to present different types of information in a format that is easy to understand and facilitates a user in recognizing the relationship of data collected from different docks 102 within the material handling facility 100. In some examples, the main server 122 automatically causes the one or more of the web pages to be updated through web-based communications 132 any time new data is collected that is relevant to the particular web pages. In this manner, the data represented in the web pages represents substantially real-time data. Although GUIs are disclosed in connection with web pages herein, the graphical user interfaces may be presented using something other than web pages (e.g., via an app, applet, application, etc.). In some examples, the main server 122 communicates with the client device 130 independent of the web server 128 using other forms of network communications 134 such as, for example, email messages, SMS (Short Message Service) messages, push notifications, etc.

Figure 13:
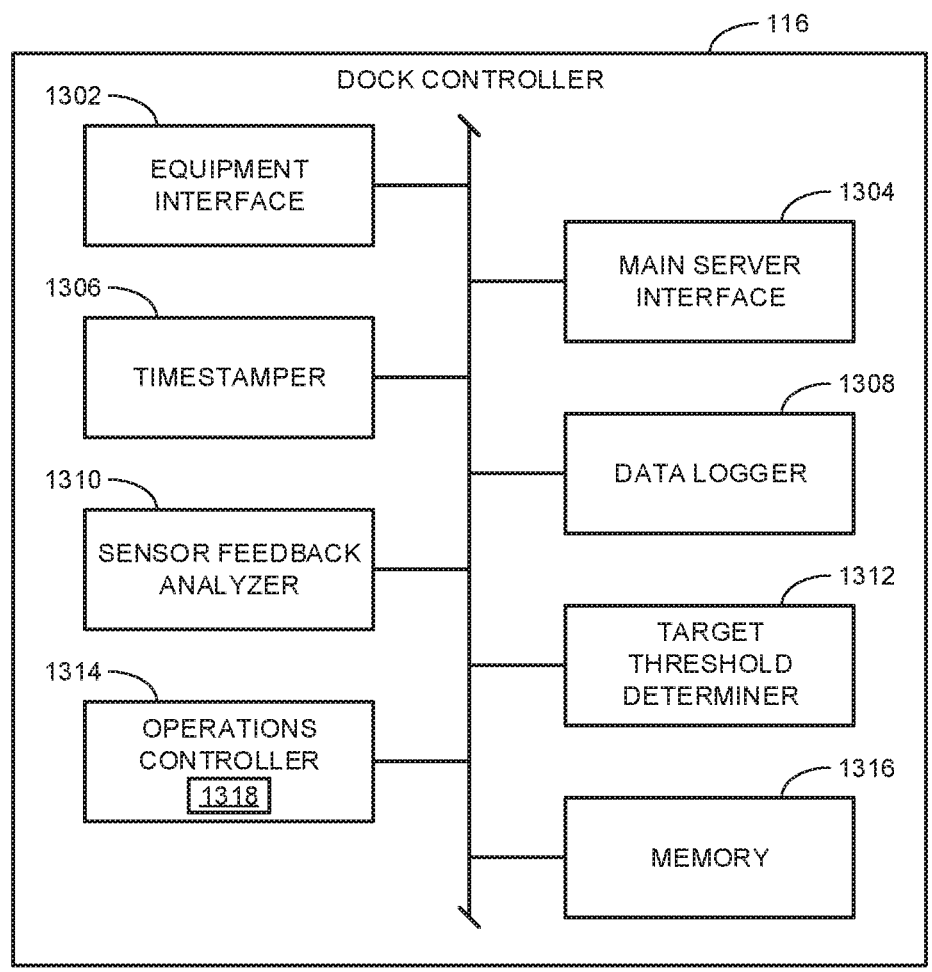
FIG. 13 is a block diagram of an example implementation of the example controller of FIG. 1.

FIG. 13 is a block diagram illustrating an example implementation of the example dock controller 116 of FIG. 1. As shown in FIG. 13, the example dock controller 116 includes an example equipment interface 1302, an example main server interface 1304, an example timestamper 1306, an example data logger 1308, an example sensor feedback analyzer 1310, an example target threshold determiner 1312, an example operations controller 1314, and example memory 1316.

The example equipment interface 1302 enables communications between the controller 116 and equipment associated with one or more of the door 104, the doorway barrier 106, the dock leveler 108, the vehicle restraint 110, the presence detector 112, and the notification system 114. That is, in some examples, the controller 116 may provide instructions and/or commands to different pieces of equipment associated with the corresponding dock 102 via the equipment interface 1302. Further, the controller 116 may receive feedback from sensors associated with the equipment via the equipment interface 1302. In some examples, the equipment interface 1302 includes a user interface by which a user may provide inputs to the controller 116 to direct its operation.

The example main server interface 1304 enables communications between the controller 116 and the main server 122. That is, in some examples, the controller transmits or reports sensor feedback and/or other information to the main server 122 via the main server interface 1304. Further, in some examples, the controller 116 may receive information, instructions, and/or commands from the main server 122 via the main server interface 1304.

The example timestamper 1306 timestamps sensor feedback data obtained via the equipment interface 1302 and stores such data in the example memory 1316. The example data logger 1308 logs the sensor feedback data in the memory 1316 with the associated timestamp provided by the example timestamper 1306. Additionally or alternatively, the example data logger 1308 may provide the timestamped sensor feedback data to the main server 122 via the main server interface 1304.

The example sensor feedback analyzer 1310 analyzes feedback from sensors associated with the equipment at the dock 102 to enable the controller 116 to determine the status and/or condition of the equipment and provide suitable commands and/or instructions to the equipment based on the reported status and/or condition of the equipment. More particularly, in some examples, the sensor feedback analyzer 1310 determines when particular tasks associated with the loading and/or unloading of a trailer have been completed in accordance with specified sequences of operations. In some examples the sequences of operations to be performed are stored in the example memory 1316. Additionally or alternatively, in some examples, the sensor feedback analyzer 1310 analyzes the timestamped sensor feedback data generated by the timestamper 1306 and logged by the data logger 1308 to determine durations associated with the completion of particular tasks and/or groups of tasks associated with the sequence of operations for a particular trailer. Further, in some examples, the sensor feedback analyzer 1310 compares the durations of the particular task(s) to corresponding target thresholds set for the task(s). In some such examples, the sensor feedback analyzer 1310 determines when particular tasks are progressing on schedule with respect to the target thresholds, determines when the duration of a current task is approaching a target threshold, and/or determines when the duration of a current task has exceeded the target threshold.

The example target threshold determiner 1312 determines suitable values for the target thresholds for particular task(s). In some examples, the target threshold determiner 1312 determines the target thresholds based on an analysis of the duration of tasks completed in the past as archived in the memory 1316. That is, in some examples, the target thresholds may be adapted over time in accordance with the particular circumstances and associated efficiency of tasks at particular docks. In some examples, the target threshold determiner 1312 determines values for the target thresholds based on an average of historical durations for corresponding tasks. In other examples, different statistical measures may be used to determine suitable target thresholds including a minimum duration, a maximum duration, and/or a median duration, etc., (potentially taking into account some variance of duration). In some examples, the target threshold determiner 1312 automatically updates the target thresholds after a certain period of time (e.g., every 30 days, 60 days, 90 days, etc.).

The example operations controller 1314 controls the operations of the equipment associated with the dock 102. That is, in some examples, the operations controller 1314 generates instructions and/or commands for the equipment based on the output of the sensor feedback analyzer 1310. In some examples, the operations controller includes a GUI generator 1318 to control and/or define the user interfaces displayed by the local status indicator 306. For instance, in some examples, the GUI generator 1318 generates a user interface (e.g., the user interfaces 500-1200 of FIGS. 5-12) to be displayed by the local status indicator 306. Additionally or alternatively, the GUI generator 1318 provides relevant data to the local status indicator 306 to enable the local status indicator 306 to generate and display such user interfaces. As described above, in some examples, the user interfaces include an indication of one or more of a last task completed, a next task to be completed, a series or group of tasks to be completed, and a timing indicator 308 associated with the task(s) to be completed. In some examples, the timing indicator 308 may countdown from a beginning value corresponding to the target threshold for the task(s) as defined by the target threshold determiner 1312. Such a timing indicator provides an indication of the amount of time left to complete the corresponding tasks within the target threshold period. In other examples, the timing indicator 308 may begin at zero and count up to indicate the current amount of time spent on the relevant task(s). In some examples, if the duration to complete the task(s) exceeds the corresponding threshold, the GUI generator 1318 causes the output of the timing indicator 308 to change appearance (e.g., change color, begin flashing, etc.). In some examples, the GUI generator 1318 causes the local status indicator 306 to change appearance when the duration of the current task(s) to be completed get near the target threshold period of time but before the target threshold period has elapsed to provide a warning that the end of the target window for completing the task(s) is approaching. In some such examples, whether the duration of a current task is "near" the target threshold may be defined by a particular timeframe (e.g., 2 minutes, 5 minutes, 15 minutes, etc. before the target threshold, etc.) and/or based on a proportion of the duration of the target threshold period (e.g., when 20%, 10%, 5%, etc. of the target threshold period is remaining).

While an example manner of implementing the dock controller 116 of FIG. 1 is illustrated in FIG. 13, one or more of the elements, processes and/or devices illustrated in FIG. 13 may be combined, divided, re-arranged, omitted, eliminated and/or implemented in any other way. Further, the example equipment interface 1302, the example main server interface 1304, the example timestamper 1306, the example data logger 1308, the example sensor feedback analyzer 1310, the example target threshold determiner 1312, the example operations controller 1314, the example memory 1316, the example GUI generator 1318, and/or, more generally, the example dock controller 116 of FIG. 1 may be implemented by hardware, software, firmware and/or any combination of hardware, software, and/or firmware. Thus, for example, any of the example equipment interface 1302, the example main server interface 1304, the example timestamper 1306, the example data logger 1308, the example sensor feedback analyzer 1310, the example target threshold determiner 1312, the example operations controller 1314, the example memory 1316, the example GUI generator 1318, and/or, more generally, the example dock controller 116 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example equipment interface 1302, the example main server interface 1304, the example timestamper 1306, the example data logger 1308, the example sensor feedback analyzer 1310, the example target threshold determiner 1312, the example operations controller 1314, the example memory 1316, and/or the example GUI generator 1318 is/are hereby expressly defined to include a non-transitory computer readable storage device or storage disk such as a memory, a digital versatile disk (DVD), a compact disk (CD), a Blu-ray disk, etc. including the software and/or firmware. Further still, the example dock controller 116 of FIG. 1 may include one or more elements, processes, and/or devices in addition to, or instead of, those illustrated in FIG. 13, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 14:
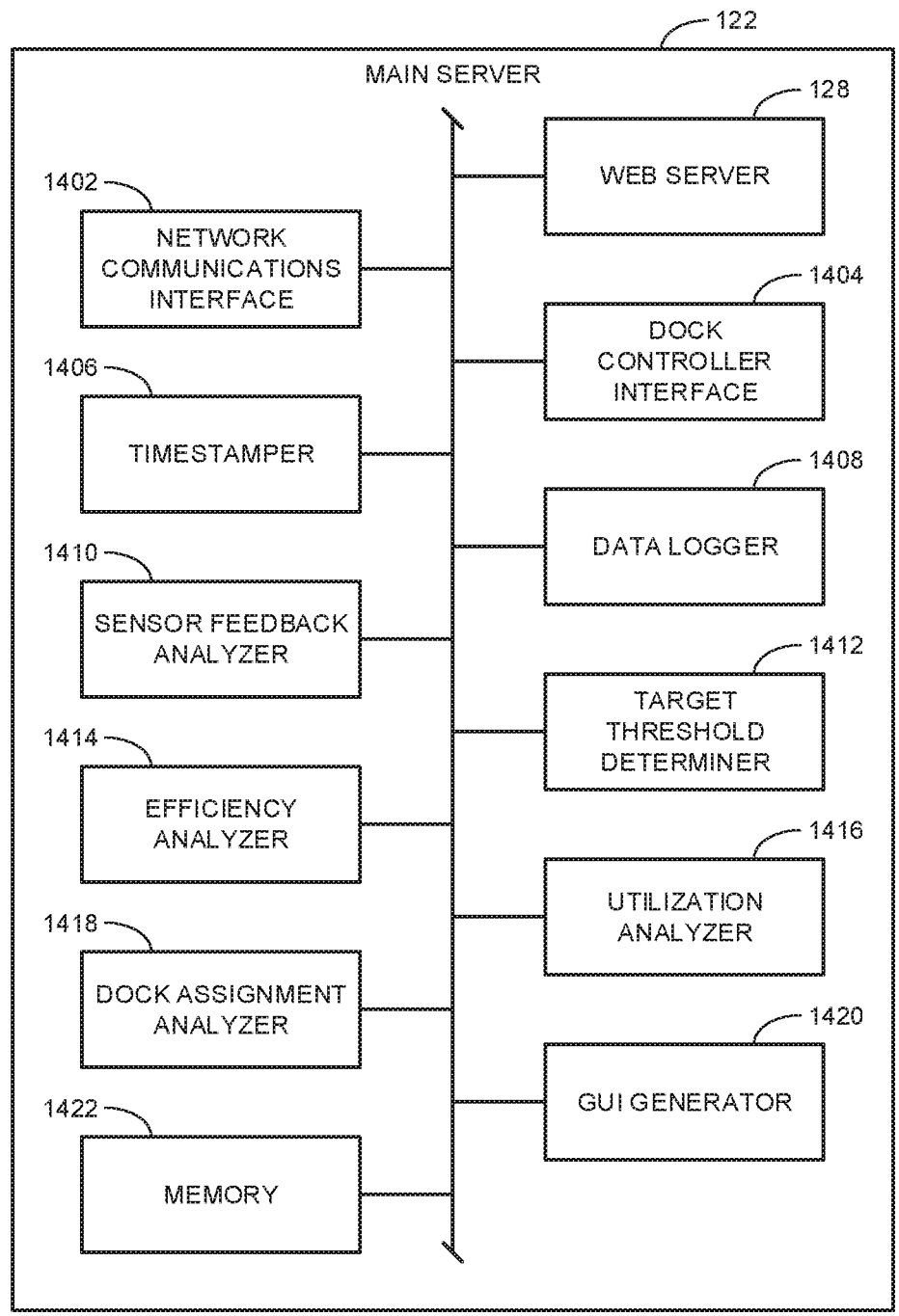
FIG. 14 is a block diagram of an example implementation of the example main server of FIG. 1.

FIG. 14 is a block diagram illustrating an example implementation of the example main server 122 of FIG. 1. As shown in FIG. 14, the example main server 122 includes the web server 128, an example network communications interface 1402, an example dock controller interface 1404, an example timestamper 1406, an example data logger 1408, an example sensor feedback analyzer 1410, an example target threshold determiner 1412, an example efficiency analyzer 1414, an example utilization analyzer 1416, an example dock assignment analyzer 1418, an example GUI generator 1420, and example memory 1422.

The example network communications interface 1402 of FIG. 14 enables communications with the client devices 130 independent of the web server 128. For instance, the network communications interface 1402 may send out email messages and/or SMS messages to one or more client devices 130. Additionally, in some examples, the network communications interface 1402 may send data to and/or receive data from the local management server(s) 124 and/or the remote server(s) 126. In some examples, data received from the servers 124, 126 is stored in the example memory 1422.

The example dock controller interface 1404 of FIG. 14 enables communications with the dock controllers 116. That is, the dock controller interface 1404 receives sensor feedback data collected by the controllers 116 and/or any other type of data reported by the controllers 116. Such data may be aggregated and stored in the memory 1422 for subsequent analysis and/or processing. Additionally or alternatively, in some examples, the dock controller interface 1404 transmits instructions, commands, and/or other types of information to the dock controllers 116.

The example timestamper 1406 in FIG. 14 provides similar functionality to the timestamper 1306 of the dock controller 116 described above in connection with FIG. 13. In some examples, the timestamper 1406 of FIG. 14 is duplicative of the timestamper 1306 of FIG. 13. In some examples, the timestamper 1306 may be omitted from the dock controller 116 of FIG. 13. In some examples, the timestamper 1406 may be omitted from the main server 122 of FIG. 14. In some examples, whether data is timestamped by the example timestamper 1306 of FIG. 13 or the example timestamper 1406 of FIG. 14, the example data logger 1408 of FIG. 14 logs the timestamped data in the example memory 1422. In some examples, the data logger 1408 logs other types of data such as load information and/or resource allocation information (e.g., provided by the management server(s) 124).

The example sensor feedback analyzer 1410 in FIG. 14 provides similar functionality to the sensor feedback analyzer 1310 of the dock controller 116 described above in connection with FIG. 13. Additionally, in some examples, the sensor feedback analyzer 1410 in the main server 122 shown in FIG. 14 also analyzes and/or compares sensor feedback data aggregated from different dock controllers 116 associated with different docks 102. In some examples, the sensor feedback analyzer 1410 of FIG. 14 is duplicative of the sensor feedback analyzer 1310 of FIG. 13. In some examples, the sensor feedback analyzer 1310 may be omitted from the dock controller 116 of FIG. 13. In some examples, the sensor feedback analyzer 1410 may be omitted from the main server 122 of FIG. 14.

The example target threshold determiner 1412 in FIG. 14 provides similar functionality to the target threshold determiner 1312 of the dock controller 116 described above in connection with FIG. 13. Additionally, in some examples, the target threshold determiner 1412 in the main server 122 shown in FIG. 14 also analyzes and/or compares durations of tasks and/or other parameters output by the sensor feedback analyzer 1410 associated with multiple different docks to determine common values for target thresholds for the different docks 102. Thus, in some examples, the same target thresholds may be defined for particular task(s) to be completed at different docks 102. In other examples, different docks 102 may be associated with different target thresholds. In some examples, the target threshold determiner 1412 of FIG. 14 is duplicative of the target threshold determiner 1312 of FIG. 13. In some examples, the target threshold determiner 1312 may be omitted from the dock controller 116 of FIG. 13. In some examples, the target threshold determiner 1412 may be omitted from the main server 122 of FIG. 14.

The example efficiency analyzer 1414 analyzes the durations of the tasks performed in connection with the loading and/or unloading of trailers at particular docks 102 (as determined by the sensor feedback analyzer 1410) to determine the efficiency with which such tasks are performed relative to other docks in the facility 100. In some examples, the efficiency of tasks at a particular dock are measured relative to target thresholds for the various tasks associated with sequence of operations relevant to the arrival, loading and/or unloading, and departure of a trailer at a particular dock. In some examples, the efficiency analyzer 1414 may analyze the collected data to generate relevant statistics that may be provided to a user to enable the user to identify potential inefficiencies (either associated with particular tasks, days or times, and/or particular docks) that can be improved upon and/or identify relatively efficient docks that may be able to handle more trailers and/or trailers with larger or more critical loads. For instance, in some examples, the efficiency analyzer 1414 may track and/or log the number of trailers associated with each dock that go into detention (e.g., the duration to complete the sequence of operations to load and/or unload the trailer extends beyond a relevant target threshold). In some examples, the example efficiency analyzer 1414 may track and/or calculate the average amount of delay and/or overage time experienced at each dock and/or across multiple (e.g., all) docks in the facility 100.

The example utilization analyzer 1416 monitors, tracks, and/or analyzes the utilization of particular docks 102 within the facility 100. As used herein, the "utilization" of a dock refers to how frequently a particular dock is in use. In some examples, utilization is quantified based on the number of trailers that are loaded and/or unloaded within a given period (e.g., number of trailer loads completed per day). In some examples, utilization may be normalized and expressed as a percentage relative to the number of trailers that can be loaded or unloaded at a dock 102 during a specified period of time (e.g., one day) when each trailer load is completed in a timely manner and the dock 102 is always in use during the specified period. That is, if the dock is operating at full capacity (always loading or unloading a trailer) and efficient (completes each trailer load on time), the dock will have a 100% utilization. A utilization percentage of less than 100% indicates that the dock has excess capacity to handle more trailers. A utilization percentage greater than 100% indicates the dock is completing more trailer loads than expected for the dock when operating efficiently at full capacity, which may suggest the number of trailer loads designated as possible of being completed at full capacity may be too low. In some examples, this number may be designated by a dock manager and/or other personnel. In some examples, this number may be calculated based on an analysis of historical data stored in the memory 1422.

The example dock assignment analyzer 1418 analyzes the efficiency and/or utilization information generated by the efficiency analyzer 1414 and/or the utilization analyzer 1416 to facilitate dock/yard managers and/or other personnel in assigning particular trailers to particular docks. For example, if the efficiency analyzer 1414 determines that a particular dock is highly efficient, the dock assignment analyzer 1418 may determine to assign extra trailers and/or trailers with larger loads to that particular dock. Additionally or alternatively, the dock assignment analyzer 1418 may identify particular docks associated with relatively low utilization to be assigned new trailers more frequently so that the equipment of other docks associated with relatively high utilization do not wear out as fast. That is, in some examples, the dock assignment analyzer 1418 may facilitate the even distribution of trailers across all docks to maintain the relatively consistent utilization of all docks. In other examples, the dock assignment analyzer 1418 may identify particular docks for more frequent usage at one point in time and a different set of docks at a different point in time based on expected maintenance schedules for the equipment associated with such docks.

In some examples, the GUI generator 1420 of FIG. 14 provides similar functionality to the GUI generator 1318 of the dock controller 116 described above in connection with FIG. 13. That is, in some examples, the GUI generator 1420 of the example main server 122 controls and/or defines the user interfaces displayed by the local status indicator 306. In some such examples, the GUI generator 1318 may be omitted from the dock controller 116 of FIG. 13. Additionally or alternatively, in some examples, the GUI generator 1420 of the illustrated example of FIG. 14 generates GUIs for display on web pages hosted by the web server 128. In some examples, the GUI generator 1420 generates GUIs for other apps, applets, applications, etc., accessible by the client device 130 independent of the web server 128. The GUIs generated by the example GUI generator 1420 may be based on outputs of one or more of the sensor feedback analyzer 1410, the target threshold determiner 1412, the efficiency analyzer 1414, the utilization analyzer 1416, and/or the dock assignment analyzer 1418 as described further below in connection with FIGS. 15-23.

While an example manner of implementing the main server 122 of FIG. 1 is illustrated in FIG. 14, one or more of the elements, processes, and/or devices illustrated in FIG. 14 may be combined, divided, re-arranged, omitted, eliminated, and/or implemented in any other way. Further, the example web server 128, the example network communications interface 1402, the example dock controller interface 1404, the example timestamper 1406, the example data logger 1408, the example sensor feedback analyzer 1410, the example target threshold determiner 1412, the example efficiency analyzer 1414, the example utilization analyzer 1416, the example dock assignment analyzer 1418, the example GUI generator 1420, the example memory 1422 and/or, more generally, the example main server 122 of FIG. 1 may be implemented by hardware, software, firmware, and/or any combination of hardware, software and/or firmware. Thus, for example, any of the example web server 128, the example network communications interface 1402, the example dock controller interface 1404, the example timestamper 1406, the example data logger 1408, the example sensor feedback analyzer 1410, the example target threshold determiner 1412, the example efficiency analyzer 1414, the example utilization analyzer 1416, the example dock assignment analyzer 1418, the example GUI generator 1420, the example memory 1422, and/or, more generally, the example main server 122 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example web server 128, the example network communications interface 1402, the example dock controller interface 1404, the example timestamper 1406, the example data logger 1408, the example sensor feedback analyzer 1410, the example target threshold determiner 1412, the example efficiency analyzer 1414, the example utilization analyzer 1416, the example dock assignment analyzer 1418, the example GUI generator 1420, and/or the example memory 1422 is/are hereby expressly defined to include a non-transitory computer readable storage device or storage disk such as a memory, a digital versatile disk (DVD), a compact disk (CD), a Blu-ray disk, etc. including the software and/or firmware. Further still, the example main server 122 of FIG.

1 may include one or more elements, processes, and/or devices in addition to, or instead of, those illustrated in FIG. 14, and/or may include more than one of any or all of the illustrated elements, processes, and devices.

Figure 15:
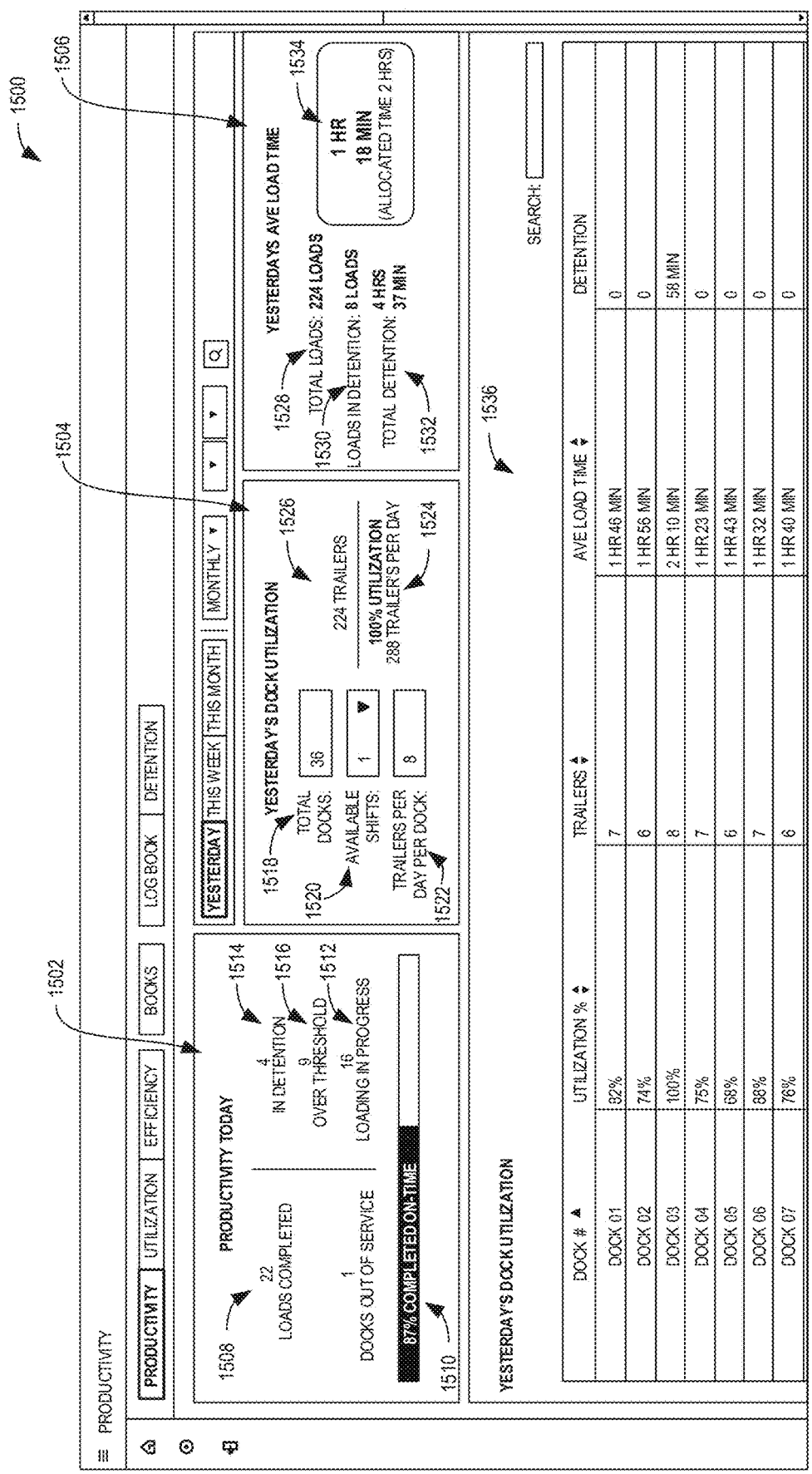

FIG. 15 is an example productivity GUI 1500 that may be generated by the GUI generator 1420 of FIG. 14. The productivity GUI 1500 provides summary statistics generated by one or more of the sensor feedback analyzer 1410, the efficiency analyzer 1414, the utilization analyzer 1416, and/or the dock assignment analyzer 1418 relating to the operations, efficiency, and/or utilization of the docks 102 in the material handling facility 100. The example GUI 1500 of FIG. 15 includes a live productivity summary block 1502, a utilization summary block 1504, and a load time summary block 1506.

The live productivity summary block 1502 provides substantially current (e.g., live) statistics (e.g., updated in substantially real-time) associated with the handling of trailers at the docks 102 on the current day. In other examples, the live productivity summary block 1502 may provide statistics associated with a different period of time other than the current day (e.g., the current week, current month, etc.). In this example, the productivity summary block 1502 includes a load completed indicator 1508 that indicates the total number of loads that have been completed during the relevant period of time (e.g., the current day). As used herein, the term "load" refers to the loading and/or unloading of a particular trailer. Thus, a "completed load" means that a particular trailer has progressed through the arrival phase, the material handling phase, and the departure phase at a particular dock 102. In some examples, a "load" may exclude some portion or all of the arrival and departure phases (e.g., a load may specifically refer to the material handling phase during which cargo is loaded and/or unloaded from a trailer). In some examples, the live productivity summary block 1502 includes an efficiency rate indicator 1510 to indicate the number and/or percentage of completed loads that were completed in a timely manner (e.g., within target thresholds corresponding to detention and/or demurrage charges) during the relevant time period (e.g., the current day).

In addition to completed loads, the example live productivity summary block 1502 includes a load in progress indicator 1512 to indicate the number of trailers at docks 102 currently progressing through the loading and/or unloading process (e.g., in one of the arrival phase, the material handling phase, or the departure phase). In some examples, the live productivity summary block 1502 includes additional data indicating delays in the progress of such loads in-progress. For example, an in detention indicator 1514 indicates the number of loads in-progress that have already exceeded the time set for detention and/or demurrage charges (e.g., 2 hours). Further, in some examples, an over threshold indicator 1516 indicates when one or more task(s) associated with the loading and unloading of a trailer took longer than a target threshold (e.g., defined by the target threshold determiner 1412) associated with the task(s).

The example utilization summary block 1504 includes an indication of the total number of docks 1518 at the material handling facility 100 (which may or may not include docks that are out of service), an indication of the number of shifts 1520 when dock personnel are available to work on loads, and a trailer capacity 1522 designated for each of the docks 102 in the facility 100. The trailer capacity 1522 is representative of the number of trailers that can be loaded or unloaded at a dock 102 during a specified period of time when each load is completed in a timely manner and the dock 102 is always in use during the specified period. In this example, the specified period corresponds to one day. In other examples, the specified period may be defined as a single shift. The example utilization summary block 1504 includes a facility capacity indicator 1524 to indicate the total number of loads that can be completed in a specified period if all docks are operated at the respective trailer capacity 1522. Thus, in this example, where there are 38 docks, each with a trailer capacity of 8 trailers per day, the facility capacity is 38×8=288 trailers per day. In some examples, the utilization summary block 1504 includes an actual utilization metric 1526 that indicates the actual number of loads (e.g., trailers) completed as a percentage of the facility trailer capacity during a particular period of time. In some examples, the actual number of trailer loads completed may also be indicated. In some examples, the particular period of time may be specified by a user to be any relevant period of time (e.g., current day, previous week, current week, current month, etc.).

The example load time summary block 1506 includes a total loads completed indicator 1528 during a particular period of time (e.g., the same period of time selected for the utilization summary block 1504). In some examples, the load time summary block 1506 includes a load detention indicator 1530 to indicate the number of trailer loads that extended past the allocated time for the load during the relevant period of time. An accumulated detention duration indicator 1532 indicates the total amount of time the loads associated with the load detention indicator 1530 were over the target threshold for the loads. In some examples, an average load time indicator 1534 indicates the average time for completion of all the loads associated with the total loads completed indicator 1528.

In some examples, the GUI 1500 of FIG. 15 includes a dock-specific summary block 1536 that provides similar information outlined above in the live productivity summary block 1502, the utilization summary block 1504, and the load time summary block 1506, except that the information is specific to each particular dock 102 in the facility 100 and/or a particular subset of docks in the facility.

Figure 16:
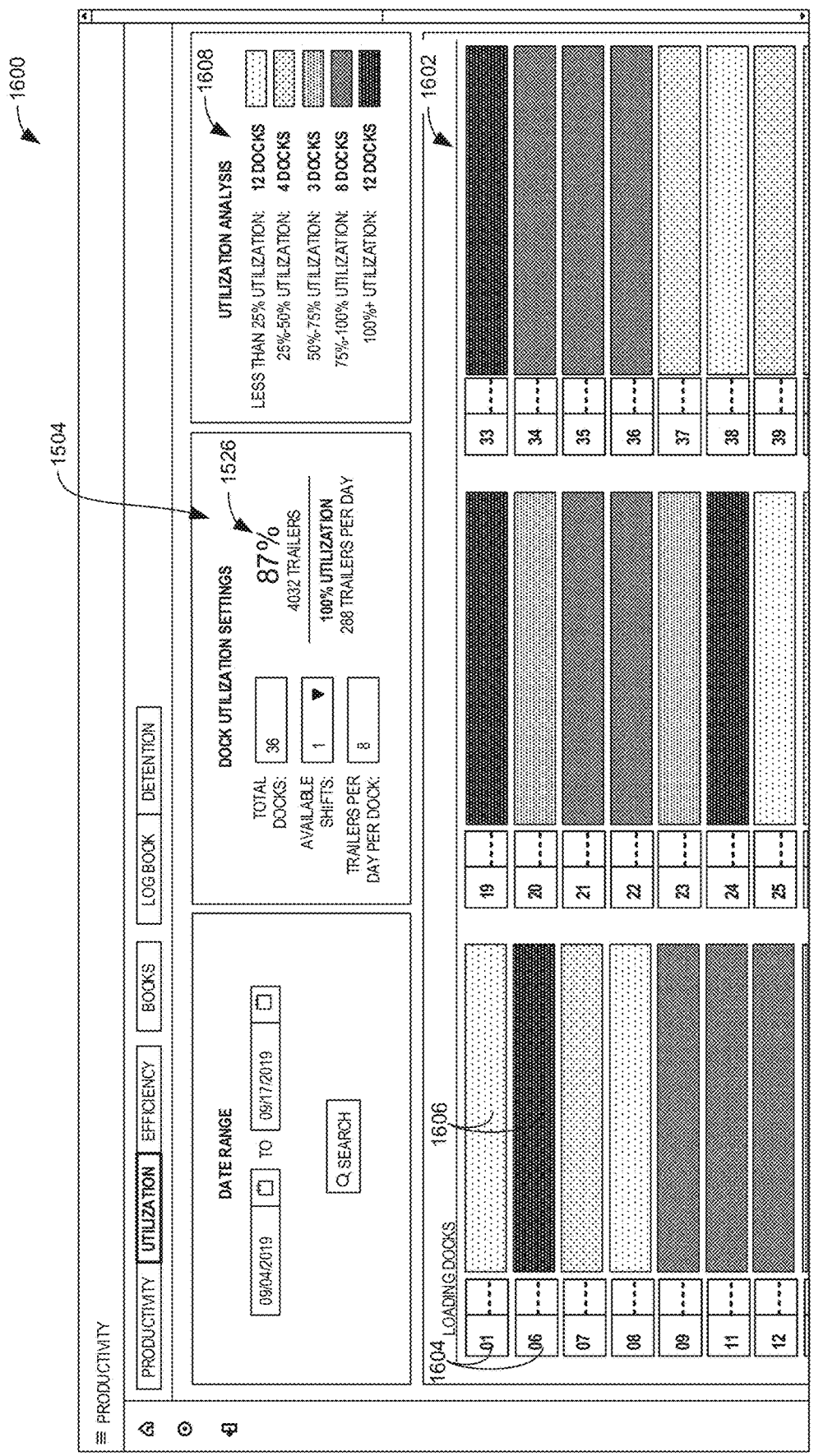

FIG. 16 is an example utilization analysis GUI 1600 that may be generated by the GUI generator 1420. The utilization analysis GUI 1600 provides the results of an analysis by the utilization analyzer 1416 on the utilization of different docks 102 at the facility 100. In some examples, the utilization analysis GUI 1600 includes a utilization heat map 1602. The example utilization heat map 1602 includes dock icons 1604 representative of each individual dock along with a corresponding utilization indicator 1606. In this example, the utilization indicators 1606 differ in appearance (e.g., color, intensity, etc.) based on the utilization of the corresponding docks. In this particular example, the different appearances of the utilization indicators 1606 include 5 different groupings corresponding to different utilization rates as outlined in the legend 1608. The utilization heat map 1602 enables a user to quickly and easily identify which docks are under-utilized and/or which docks are over utilized to assist in future assignments of trailers to particular docks. In some examples, the utilization heat map 1602 may be generated based on historical data corresponding to any user-specified period of time. In some examples, the utilization analysis GUI 1600 includes the utilization summary block 1504 included in the productivity GUI 1500 of FIG. 15 to provide context for the utilization heat map 1602. In the illustrated example of FIG. 16, the actual utilization metric 1526 is different than in FIG. 15 because the represented data correspond to a different period of time. Whereas the actual utilization metric 1526 in FIG. 15 corresponds to a single day, the actual utilization metric 1526 in FIG. 16 reflects the utilization of the docks over a two week period of time.

Figure 17:
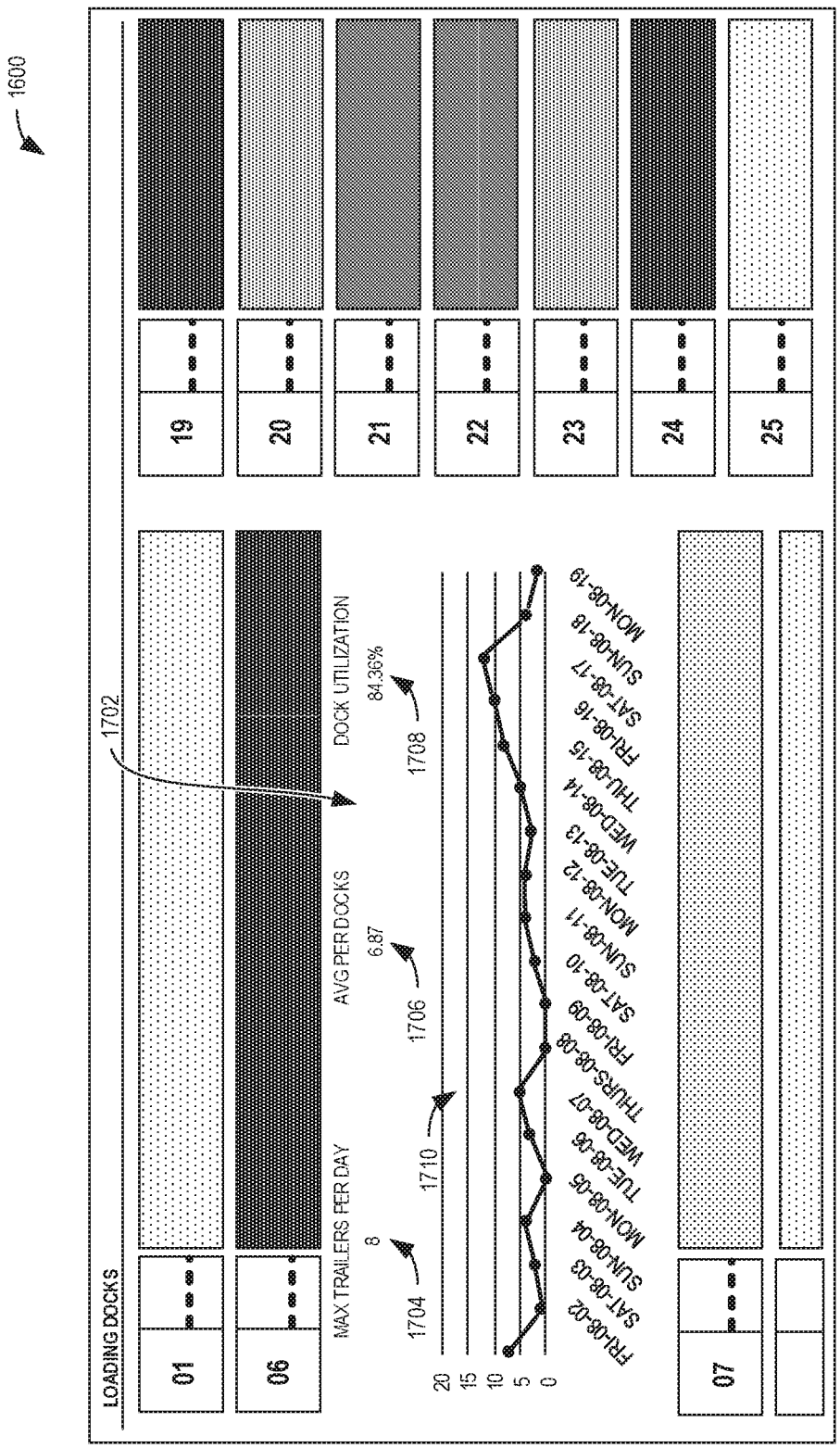

In some examples, an individual one of the dock icons 1604 and/or the utilization indicators 1606 may be selected by a user to drill down and access more detailed utilization information for the selected dock. In particular, FIG. 17 shows an enlarged portion of the utilization GUI 1600 of FIG. 16 with a dock-specific utilization window 1702 opened for a particular dock (dock number 06 in this example). In some examples, the dock-specific utilization window 1702 indicates the trailer capacity 1704 designated for the dock, the average loads completed 1706 for the relevant period, and the utilization rate 1708 for the relevant period. Further, in some examples, the dock-specific utilization window 1702 includes a plot 1710 of the number of loads completed (e.g., each day) over a relevant period of time. In some examples, the dock-specific utilization window 1702 and/or any of the information represented in the window may be generated by the GUI generator 1318 of the operations controller 1314 of the dock controller 116 corresponding with the particular dock independent of the main server 122. In some such examples, such information may be rendered for display via the display screen 117 and/or the local status indicator 306.

Figure 18:
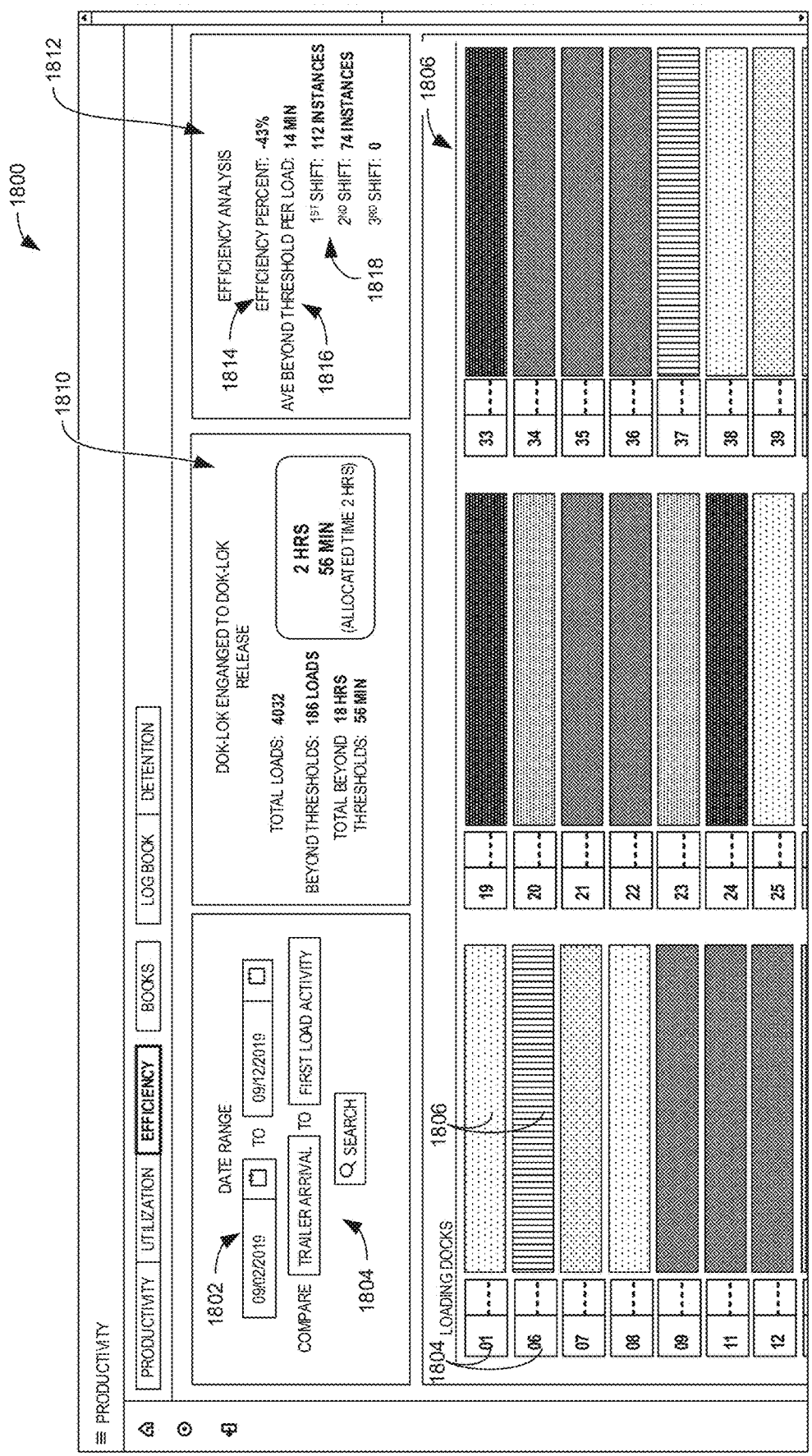

FIG. 18 is an example efficiency analysis GUI 1800 that may be generated by the GUI generator 1420. The efficiency analysis GUI 1800 provides the results of an analysis by the efficiency analyzer 1414 on the efficiency of different docks 102 at the facility 100 between different tasks in the sequence of operations associated with a particular trailer at a dock over a user specified period of time. That is, in some examples, a user is able to select any particular date range 1802 and any particular sequence of operations 1804 (by defining the initial and final tasks in the sequence of interest) and be provided efficiency information associated with the docks in the facility for the selected date range and sequence of operations. In particular, in some examples, the efficiency analysis GUI 1800 includes an efficiency heat map 1806. The example efficiency heat map 1806 of FIG. 18 is similar to the utilization heat map 1602 of FIG. 16 except that efficiency indicators 1808 differ in appearance (e.g., color, intensity, etc.) based on an average duration to complete the particular sequence of operations at each respective dock during the particular date range specified by the user. In some examples, the efficiency indicators 1808 associated with docks having an average sequence duration that is less than a target threshold for the sequence share a common visual characteristic that differs from efficiency indicators 1808 associated with docks having an average sequence duration that exceeds the relevant target threshold. For instance, in some examples, the efficiency indicators 1808 for docks with an average sequence duration that is less than the target threshold may all be of the same color (e.g., blue) but have different intensities (e.g., different shades of blue) depending on how much below the target threshold the average sequence duration is for each dock. On the other hand, efficiency indicators 1808 for docks with an average sequence duration that exceeds the target threshold may be a different color (e.g., red). In this manner, docks associated with particularly low efficiency (e.g., average sequence durations that exceed a target threshold) may be quickly and easily identified by a user. In other examples, the efficiency indicators 1808 are associated with a consistent or absolute efficiency such that even if the average sequence duration for a particular dock is less than the target threshold for the parameters selected (e.g., the particular group or sequence of tasks selected), the appearance of the corresponding efficiency indicator 1808 would signify when even one threshold within the sequence was exceeded. In some examples, the appearance of the efficiency indicators 1808 is based on the least efficient task (e.g., task for which the delay passed a relevant target threshold was the longest) within the particular sequence of tasks selected by the user.

In some examples, the efficiency analysis GUI 1800 includes an efficiency summary block 1810 that is similar to the load time summary block 1506 in the productivity GUI 1500 of FIG. 15 except that the information in the efficiency summary block 1810 of FIG. 18 is based on the particular subset of tasks in the sequence of operations selected by the user rather than a complete load (including the full sequence of operations for a particular trailer). In the illustrated example of FIG. 18, the particular sequence of operations includes the duration between when the vehicle presence is detected during the arrival phase to when the first load activity occurs during the material handling phase.

Further, in some examples, the efficiency analysis GUI 1800 includes an efficiency statistics block 1812 that includes an efficiency percentage indicator 1814 representing the change in efficiency that the loads with target threshold overages account for, an indication 1816 of the average length of time the user-selected sequence of operations extends beyond the relevant target threshold time period for the sequence for loads with target threshold overages, and indications 1818 of the number of separate trailer loads that were over time and when (e.g., which shift) such overages occurred.

Figure 19:
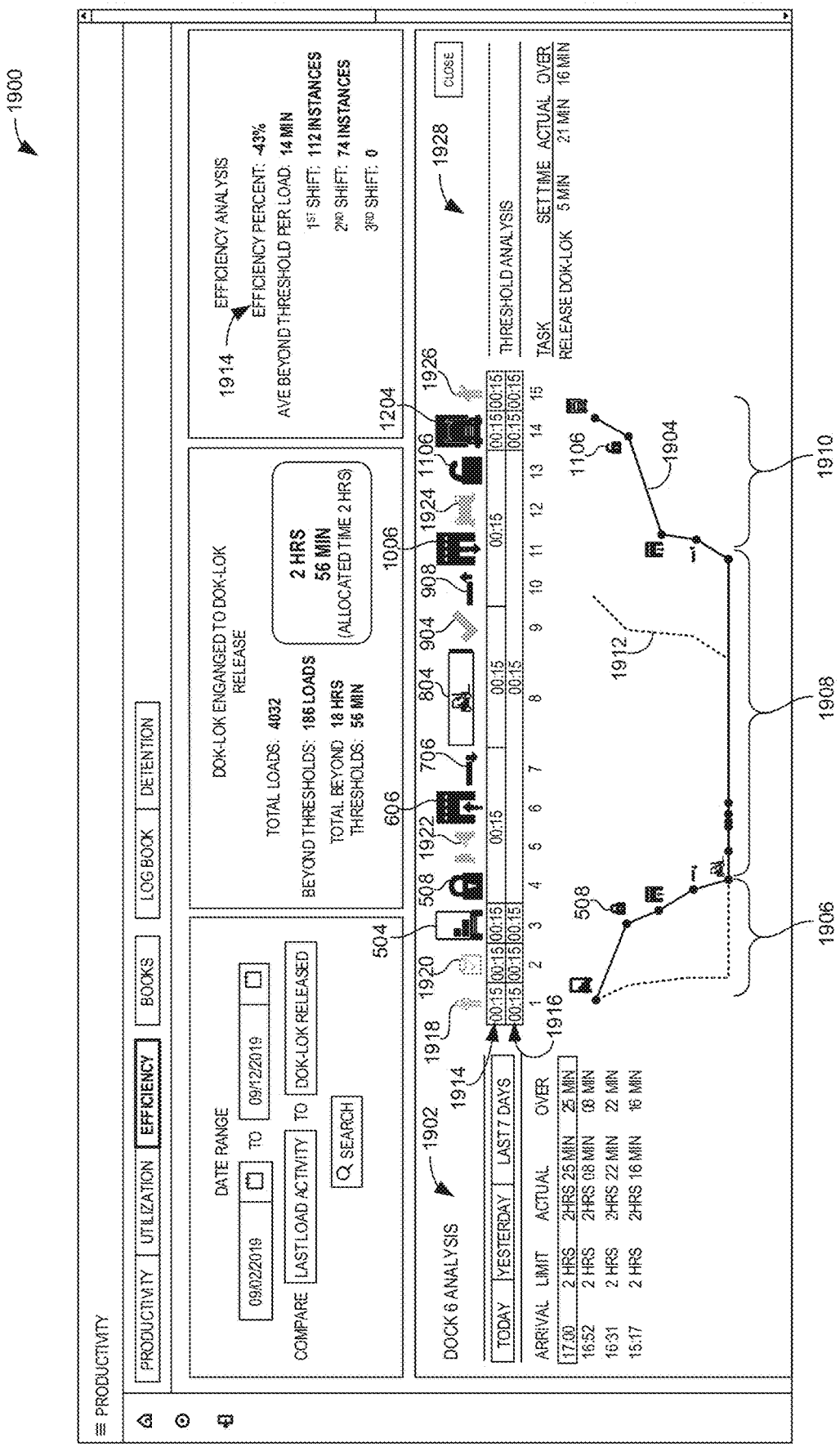

In some examples, a user may select a particular dock (e.g., in the efficiency heat map 1806) to drill down and access more specific information about the historical efficiency of the particular dock. In particular, FIG. 19 is an example dock-specific efficiency GUI 1900 that may be generated by the GUI generator 1420 in response to a user selecting to access additional details about the efficiency of a particular dock. In some examples, the additional details provided include a listing 1902 of loads completed at the particular dock during a relevant period of time that went over time (e.g., the duration to completion exceeded the target threshold, or at least one target threshold associated with a particular task or grouping of tasks within the loading/unloading process was exceeded). Further, in some examples, a user may select any one of the over time loads identified in the list 1902 to view a sequence of operations timeline 1904 that plots the actual timing for each task performed in connection with the load. In some examples, the timeline 1904 may be one dimensional. In other examples, the timeline 1904 is two-dimensional. More particularly, as shown in the illustrated example, the activity and/or task(s) associated with the arrival phase 1906 advance along the horizontal time dimension while also descending vertically, the activity and/or tasks associated with the material handling phase 1908 extend horizontally along the time dimension, and the activity and/or task associated with the departure phase 1910 continue to extend horizontally along the time dimension while also ascending vertically.

In some examples, each dot on the timeline 1904 represents the completion of a particular task (and the corresponding beginning of the duration to complete the next task). In some examples, a task icon representative of each task is provided adjacent the corresponding dot on the timeline 1904 to facilitate a user in recognizing what each dot on the timeline represents. In some examples, the task icons are the same icons used in the user interfaces 500-1200 of FIGS. 5-12 described above. As shown in the illustrated example, there are multiple dots on the timeline 1904 associated with the material handling phase 1908. In some examples, each of the dots in the material handling phase represents each distinct point in time when activity was detected in the trailer as determined by a sensor (e.g., the motion sensor 204) associated with the presence detector 112 described above in connection with FIG. 1-4. Plotting each time activity in the trailer is detected enables a user to identify the temporal distribution of such activity across the material handling phase 1908.

In some examples, an efficiency target timeline 1912 is included in the dock-specific efficiency GUI 1900 alongside the timeline 1904. In some examples, the efficiency target timeline 1912 has a different appearance (e.g., different color, different intensity, different thickness, dashed versus solid, etc.) than the timeline 1904 to enable a user to distinguish the one from the other. The efficiency target timeline 1912 represents the target thresholds defined for the sequence of operations in the timeline 1904. Providing the timeline 1904 representative of the actual completion times/durations of the different tasks alongside the efficiency target timeline 1912 in this manner enables users to quickly and easily identify the particular task(s) that may have caused the particular load being represented to go over time (e.g., extend beyond the target threshold period for the completed load). In this particular example, a quick glance of the timeline 1904 relative to the efficiency target timeline 1912 enables a user to recognize that the bulk of the delay in completing this particular load was due to the engagement and release of the vehicle restraint 110 (represented by a restraint lock icon 508 and a restraint unlock icon 1106) extending significantly beyond the associated target thresholds for such tasks. In some examples, the task icons associated with tasks that took longer to complete than their corresponding target threshold (e.g., the lock icons 508, 1106) are changed in appearance (e.g., a different color, different intensity, etc.) relative to other icons associated with tasks that were completed within their allotted amounts of time (e.g., within the target threshold). In some examples, only the icon associated with the longest delay is changed in appearance.

In some examples, the dock-specific efficiency GUI 1900 provides target threshold values 1914 for different tasks and/or combinations of tasks being tracked in connection with the particular dock. Additionally or alternatively, in some examples, actual durations 1916 for the different tasks and/or combination of tasks recorded for the particular trailer load are represented. As shown in the illustrated example, both the target threshold values 1914 and the actual durations 1916 are provided alongside one another to enable the comparison of the values. Further, in some examples, the particular task(s) associated with each target threshold value 1914 and the actual durations 1916 are identified by including task icons representative of the possible tasks in the full sequence of operations associated with the trailer alongside (e.g., above) the target threshold values and actual durations. In this particular example, the task icons include a driver arrival icon 1918, a driver check-in icon 1920, the trailer present icon 504 (discussed above in FIG. 5), the vehicle restraint lock icon 508 (discussed above in FIG. 5), an open barrier icon 1922, the door open icon 606 (discussed in FIG. 6), engage leveler icon 706 (discussed above in FIG. 7), the trailer activity icon 804 (discussed above in FIG. 8), the load complete icon 904 (discussed above in FIG. 9), the disengage leveler icon 908 (discussed above in FIG. 9), the close door icon 1006 (discussed above in FIG. 10), a close barrier icon 1924, the restraint unlock icon 1106 (discussed above in FIG. 11), the trailer depart icon 1204 (discussed above in FIG. 12), and a driver check-out icon 1926. In the illustrated examples, some of the icons are grayed out because they are not available with respect to the particular dock represented in the dock-specific efficiency GUI 1900.

In some examples, a user may select a particular task (e.g., select the corresponding icon) to view task threshold details 1928. In this example, the task threshold details 1928 includes the set target threshold value for the task, the actual duration to complete the task for the particular trailer load represented, and the amount of time the duration of the task was over the target threshold. In other examples, all tasks or groups of tasks which were over the target threshold for the load selected from the list 1902 (or for all loads in the list 902) are identified in the task threshold details 1928.

In some examples, some or all of the information represented in the dock-specific efficiency GUI 1900 may be generated by the GUI generator 1318 of the operations controller 1314 of the dock controller 116 corresponding with the particular dock independent of the main server 122. In some such examples, such information may be rendered for display via the display screen 117 and/or the local status indicator 306.

Figure 20:
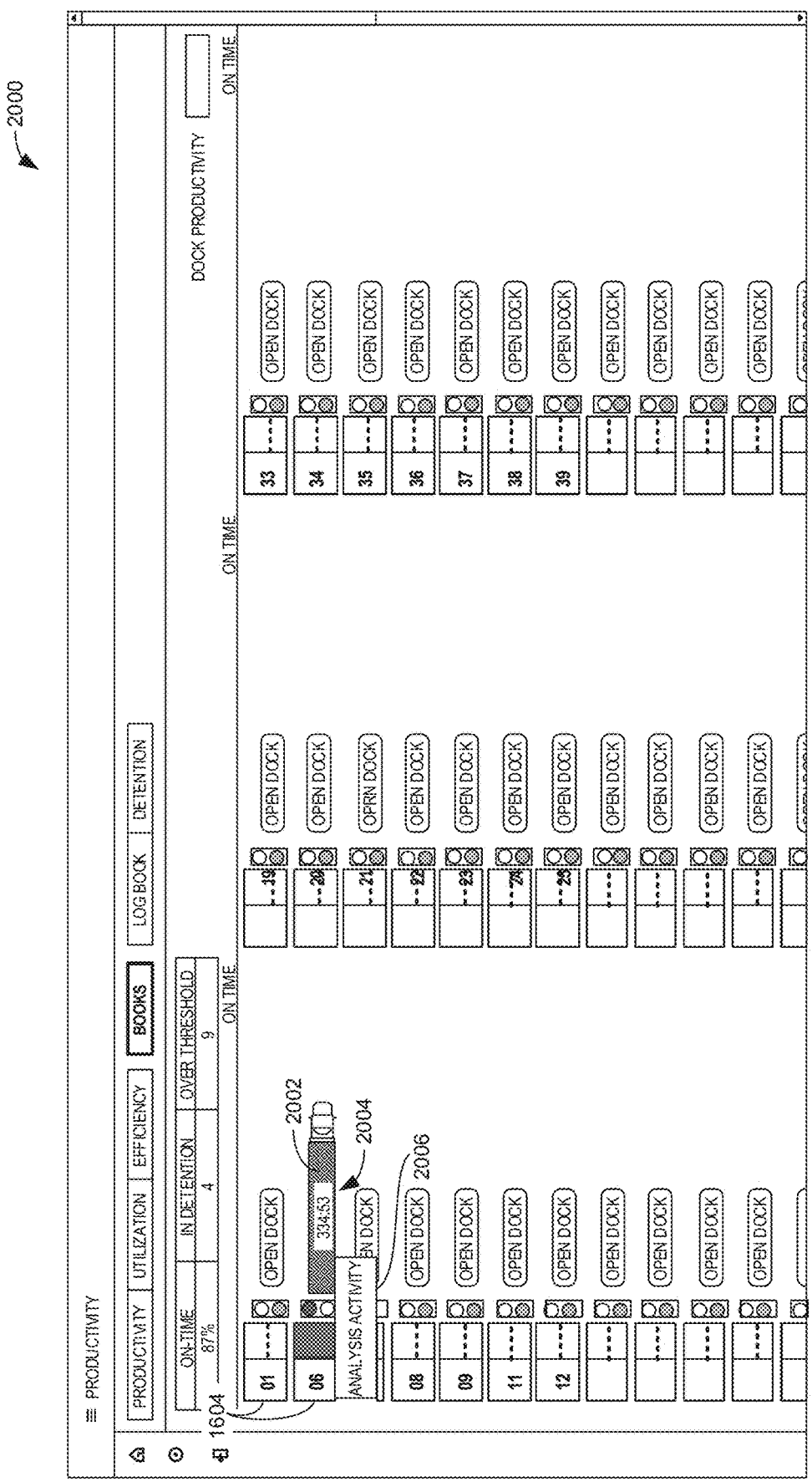

Except for the live productivity summary block 1502 in the example productivity GUI 1500 of FIG. 15 that includes data regarding in-progress loads, all of the information in the GUIs of FIGS. 15-19 are generated based on historical data archived in the memory. In some examples, the GUI generator 1420 of the main server 122 may also generate GUIs based on live data that provide additional details regarding in-progress loads in substantially real-time. For example, FIG. 20 is a live dock GUI 2000 that includes an indication of the substantially real-time status and/or progress of trailers at docks. In some examples, a trailer icon 2002 is represented adjacent each dock icon 1604 corresponding to a dock 102 of the facility 100 at which a trailer is parked. In some examples, a timing indicator 2004 is included within the trailer icon to indicate how long the trailer has been at the respective dock. In some examples, the timing indicator 2004 provides the same timing information as the timing indicator 308 provided on the local status indicator 306. That is, the timing indicator 2004 in FIG. 20 may count up or count down and change appearance when the time gets near and/or passes a relevant target threshold. Additionally or alternatively, the trailer indicator 2002 may change appearance (e.g., change color, begin flashing, etc.) when the time gets near and/or passes a relevant target threshold.

Figure 21:
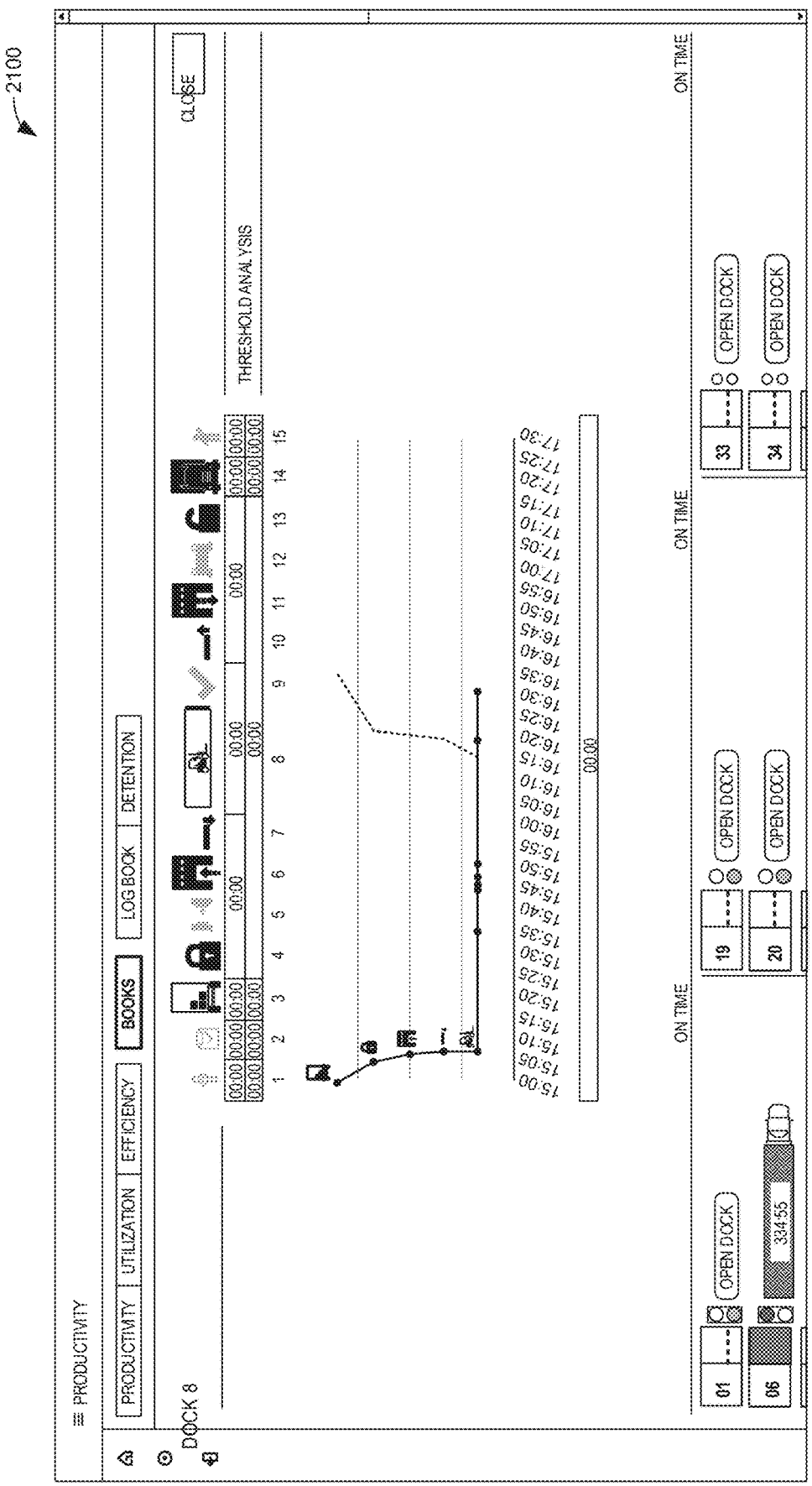

In some examples, hovering over and/or selecting a particular dock icon 1604 and/or the trailer icon 2002 causes a detailed analysis option 2006 to appear that enables a user to select to drill down and access further detail about the substantially real-time status and/or progress of the corresponding trailer. FIG. 21 is a dock-specific live status GUI 2100 that may be presented to a user in response to the user selecting the detailed analysis option. As shown in the illustrated example, the dock-specific live status GUI 2100 includes similar information presented in a similar way to that described above in connection with the dock-specific efficiency GUI 1900 except that the data represented in FIG. 21 corresponds to an in-progress load and may be updated in substantially real-time. Thus, as shown in the illustrated example, none of the icons associated with the departure phase are plotted on the timeline because they have not been completed yet. In some examples, some or all of the information represented in the dock-specific live status GUI 2100 may be generated by the GUI generator 1318 of the operations controller 1314 of the dock controller 116 corresponding with the particular dock independent of the main server 122. In some such examples, such information may be rendered for display via the display screen 117 and/or the local status indicator 306.

Figure 22:
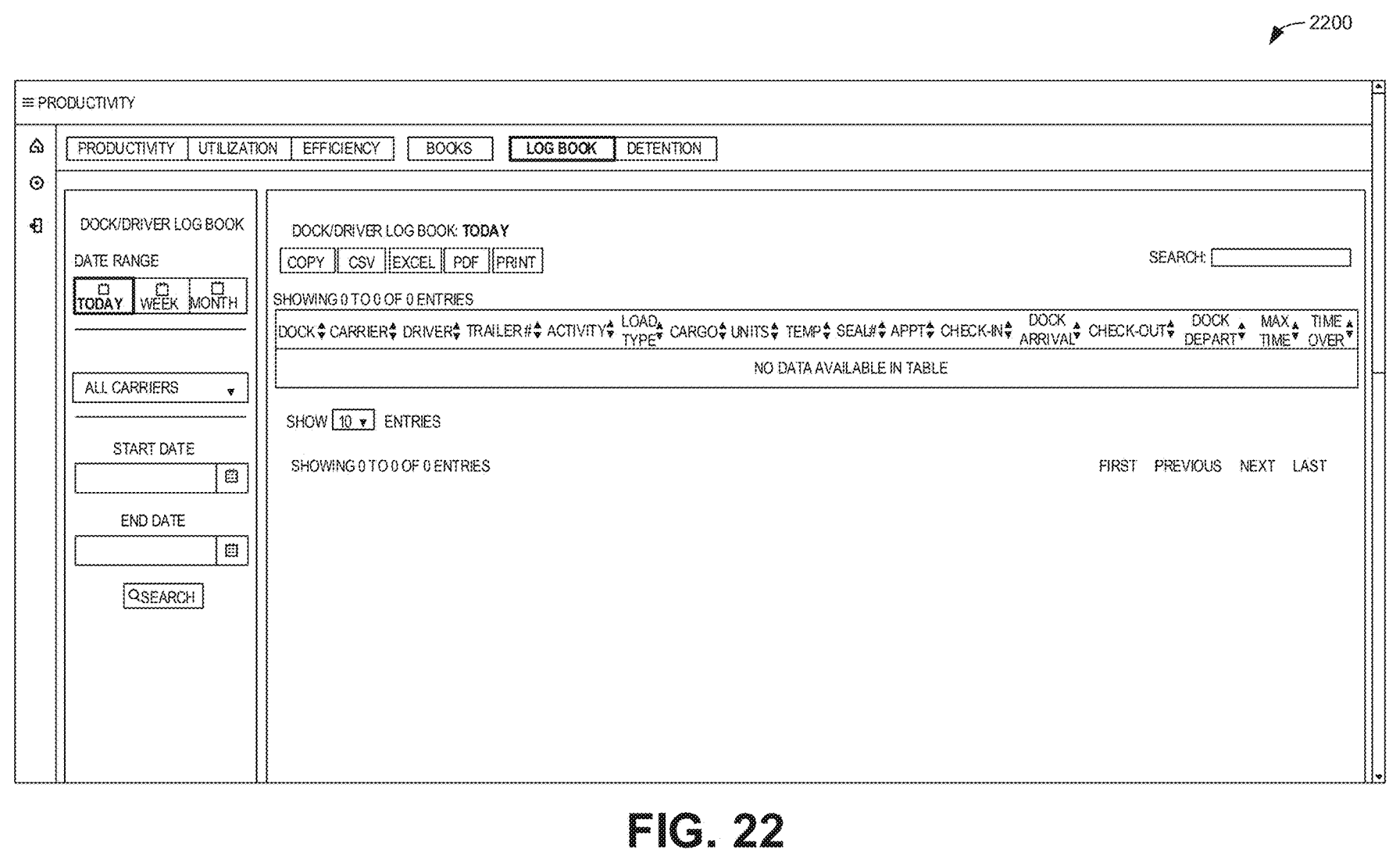

FIG. 22 is an example driver log book GUI 2200 that may be generated by the GUI generator 1420. The example driver log book GUI 2200 provides tabulated load information and/or timing information about trailer loads completed during any suitable period of time. In some examples, the information represented in the driver log book GUI 2200 may be sorted and/or filtered based on any type of information (e.g., by carrier, time of day, shift, day of week, inbound or outbound, etc.) to focus on trailer loads having particular characteristics.

Figure 23:
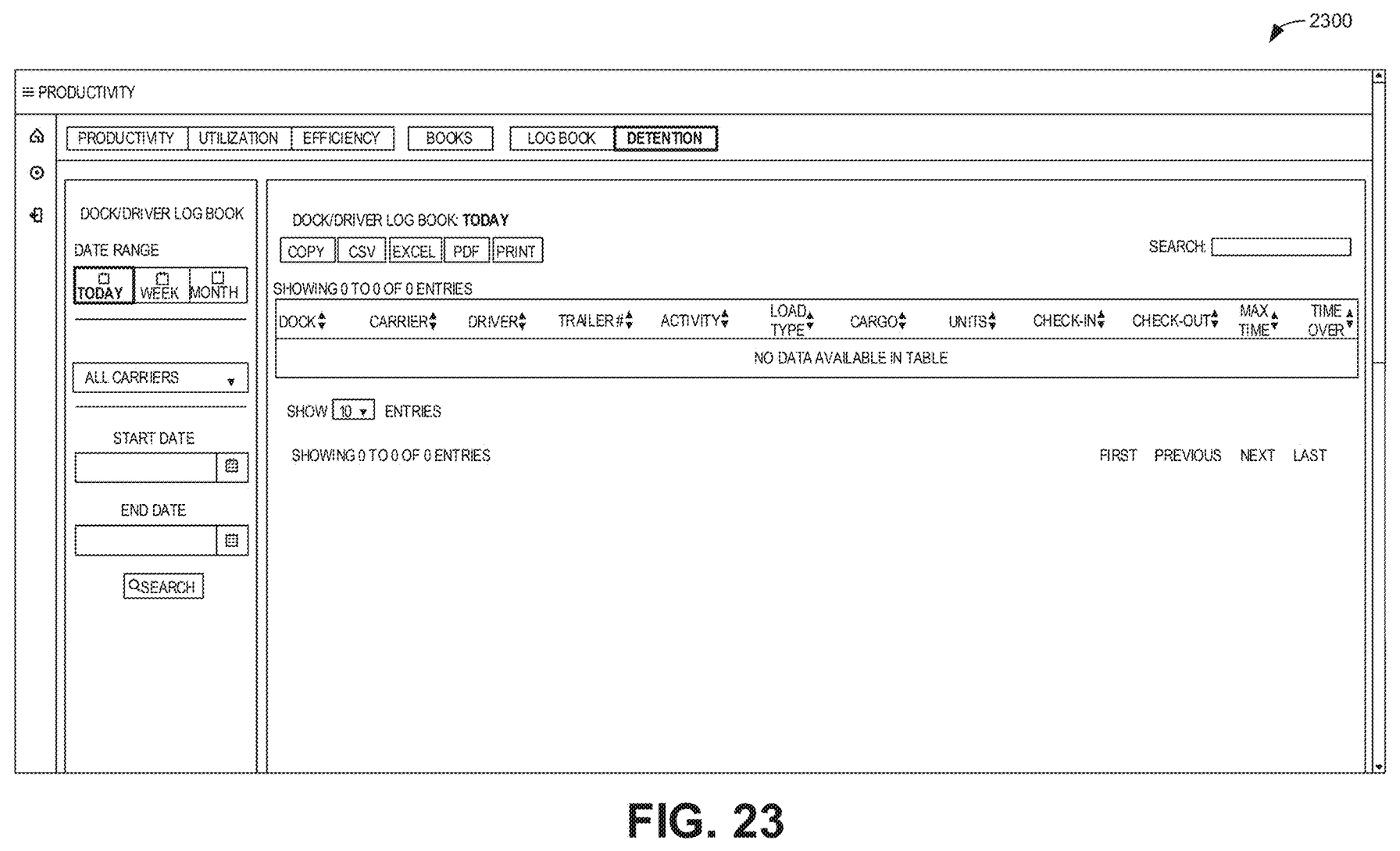

FIG. 23 is an example detention reporting GUI 2300 that may be generated by the GUI generator 1420. The example detention reporting GUI 2300 provides tabulated load information and/or timing information about trailer loads that went into detention before being completed (e.g., the loads took more time to complete than the target threshold). Organizing such data specifically for loads that went over time in this manner enables users to sort and/or filter such loads to identify trends and/or patterns that may suggest particular aspects of such loads that gave rise to the delays so as to identify areas to focus on to improve efficiency and reduce such detentions in the future.

Flowcharts representative of example hardware logic, machine readable instructions, hardware implemented state machines, and/or any combination thereof for implementing the main server 122 of FIGS. 1 and/or 14 are shown in FIGS. 24-27. The machine readable instructions may be one or more executable programs or portion(s) of an executable program for execution by a computer processor such as the processor 2812 shown in the example processor platform 2800 discussed below in connection with FIG. 28. The program may be embodied in software stored on a non-transitory computer readable storage medium such as a CD-ROM, a floppy disk, a hard drive, a DVD, a Blu-ray disk, or a memory associated with the processor 2812, but the entire program and/or parts thereof could alternatively be executed by a device other than the processor 2812 and/or embodied in firmware or dedicated hardware. Further, although the example program is described with reference to the flowchart illustrated in FIGS. 24-27, many other methods of implementing the example main server 122 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 24-27 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 24:
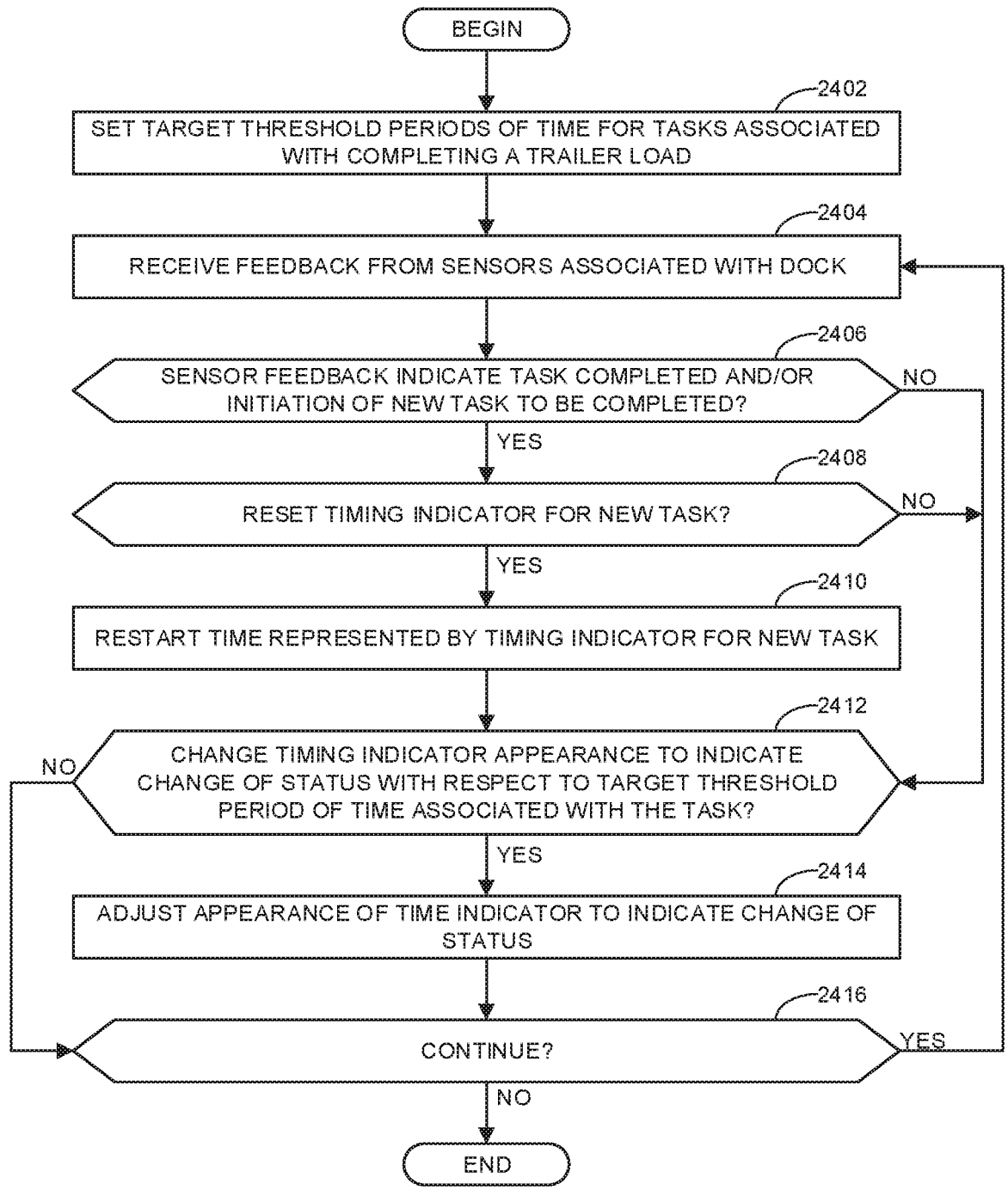
FIGS. 24-27 are flowcharts representative of example machine readable instructions which may be executed to implement the example main server of FIGS. 1 and/or 14.

The program of FIG. 24 begins at block 2402 where the example target threshold determiner 1412 sets target threshold periods of time for tasks associated with completing a trailer loading or unloading process. At block 2404, the example dock controller interface 1404 receives feedback from sensors associated with a dock 102. At block 2406, the example sensor feedback analyzer 1410 determines whether the sensor feedback indicates a task is completed and/or indicates the initiation of a new task to be completed. If so, control advances to block 2408 where the example GUI generator 1420 determines whether to reset the timing indicator 308 for the new task. If so, control advances to block 2410 where the example GUI generator 1420 restarts the time represented by the timing indicator 308 for the new task. Thereafter, control advances to block 2410. Returning to block 2406, if the example sensor feedback analyzer 1410 determines no task has been completed and no new task has begun, control advances directly to block 2412. If, at block 2408, the example GUI generator 1420 determines not to reset the timing indicator 308 for the new task, control again advances directly to block 2412.

At block 2412, the example GUI generator 1420 determines whether to change the timing indicator 308 appearance to indicate a change of status with respect to a target threshold period of time associated with the task. In some examples, the change of status may be based on the time represented by the timing indicator 308 getting near to the target threshold and/or exceeding the target threshold period of time. If so, control advances to block 2414 where the example GUI generator 1420 adjusts the appearance of the timing indicator to indicate the change of status. Thereafter, control advances to block 2416. If, at block 2412, the GUI generator 1420 determines not to change the timing indicator appearance, control advances to block 2416. At block 2416, the example main server 122 determines whether to continue the process. If so, control returns to block 2402. Otherwise, the example process of FIG. 24 ends. Although the program of FIG. 24 is described as being implemented by the main server 122, in some examples, the example program may additionally or alternatively be implemented by the dock controller 116.

Figure 25:
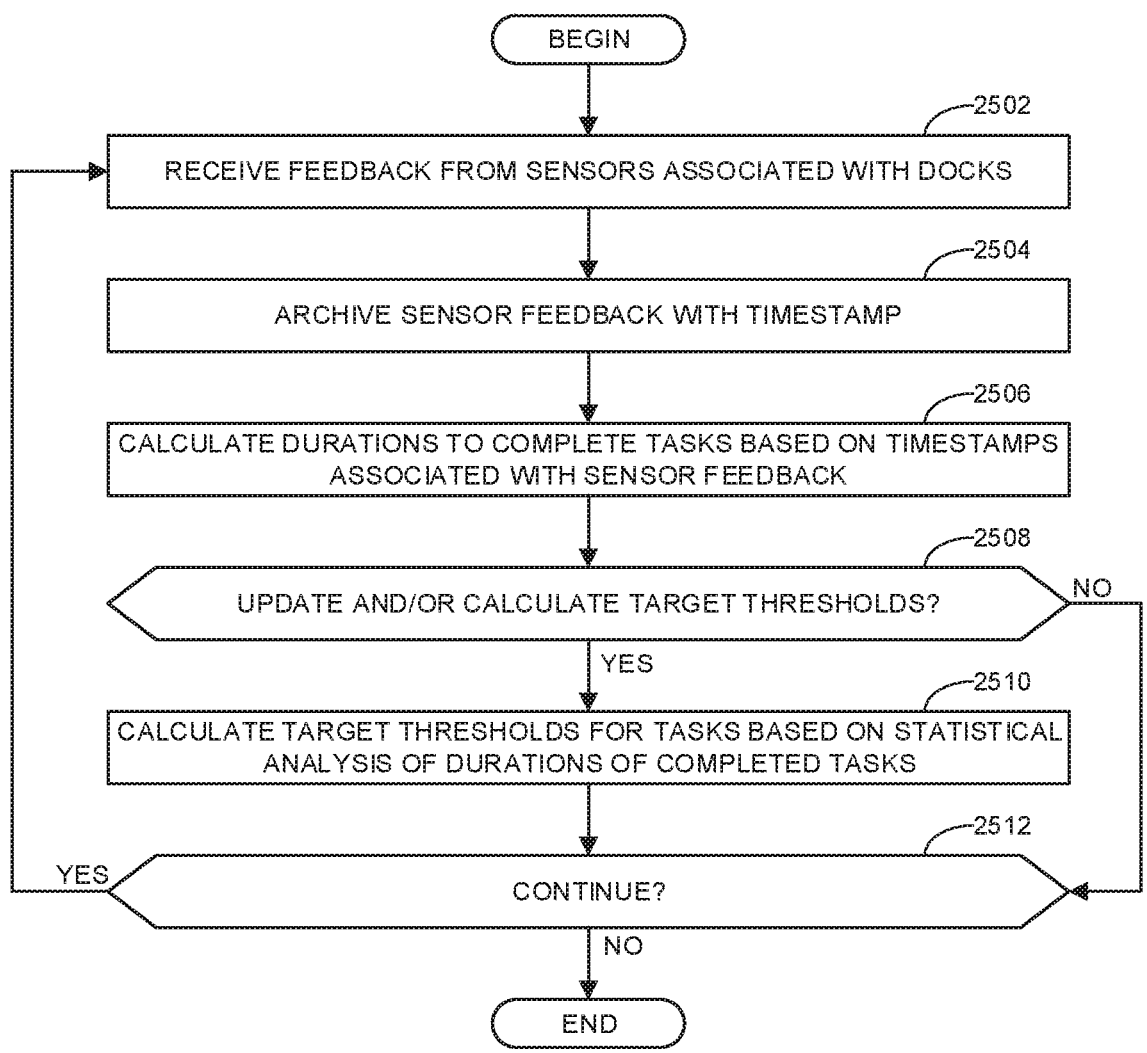

The example program of FIG. 25 begins at block 2502 where the example dock controller interface 1404 receives feedback from sensors associated with docks. At block 2504, the example data logger 1408 archives the sensor feedback with a timestamp (e.g., provided by the example timestamper 1406). At block 2506, the example sensor feedback analyzer 1410 calculates durations to complete tasks based on the timestamps associated with the sensor feedback. At block 2508, the example target threshold determiner 1412 determines whether to update and/or calculate target thresholds. If so, control advances to block 2510 where the example target threshold determiner 1412 calculates target thresholds for tasks based on a statistical analysis of the durations of completed tasks. Thereafter, control advances to block 2512. If, at block 2508, the example target threshold determiner 1412 determines not to update and/or calculate the target thresholds, control advances direction to block 2512. At block 2512, the example main server 122 determines whether to continue the process. If so, control returns to block 2502. Otherwise, the example process of FIG. 25 ends.

Figure 26:
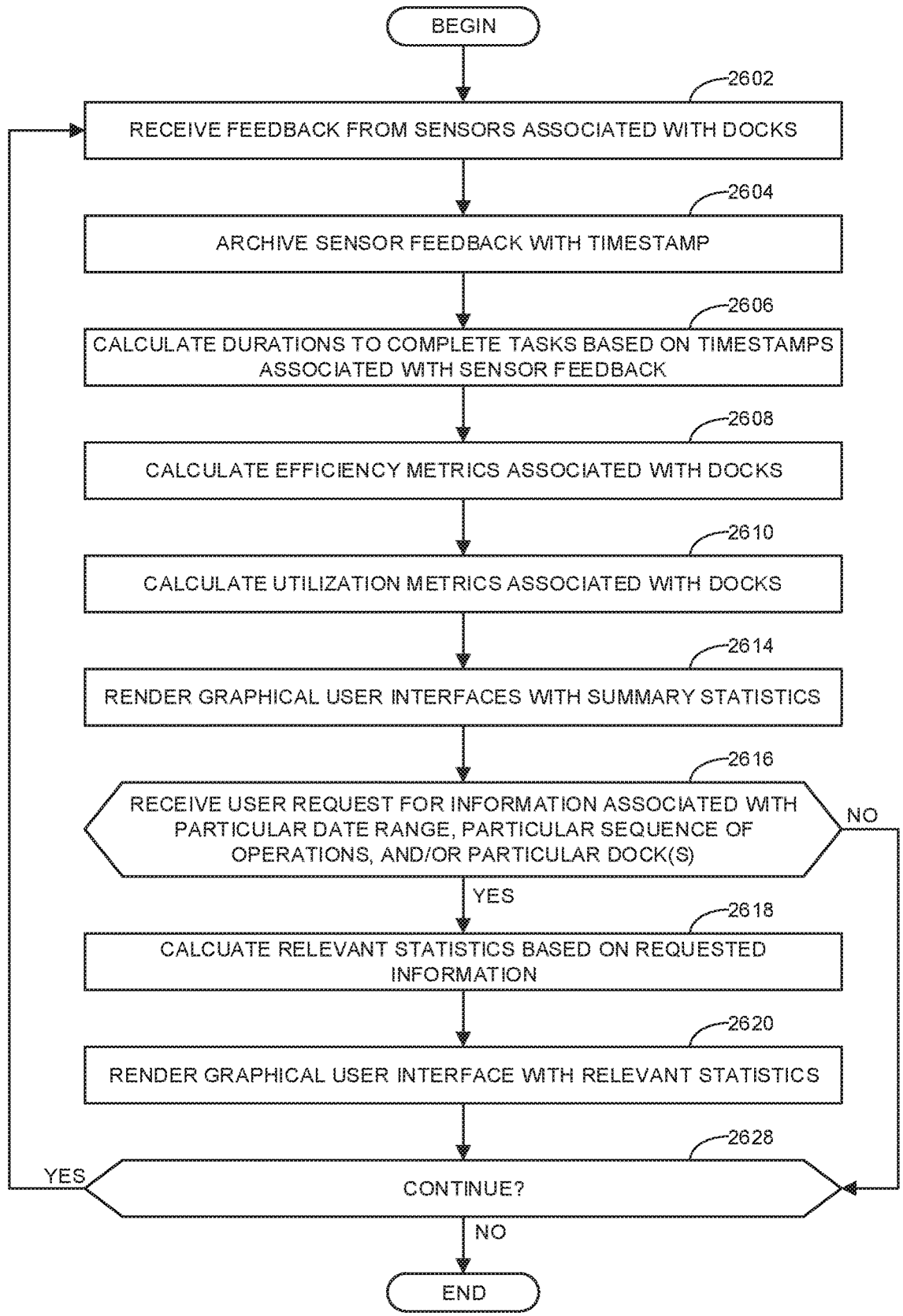

The example program of FIG. 26 begins at block 2602 where the example dock controller interface 1404 receives feedback from sensors associated with docks. At block 2604, the example data logger 1408 archives the sensor feedback with a timestamp (e.g., provided by the example timestamper 1406). At block 2606, the example sensor feedback analyzer 1410 calculates durations to complete tasks based on the timestamps associated with the sensor feedback. At block 2608, the example efficiency analyzer 1414 calculates efficiency metrics associated with the docks. At block 2610, the example utilization analyzer 1416 calculates utilization metrics associated with docks. At block 2614, the example GUI generator 1420 renders graphical user interfaces with summary statistics.

At block 2616, the example web server 128 and/or the example network communications interface 1402 determines whether a user request for information associated with a particular data range, a particular sequence of operations, and/or particular dock(s) is received. If so, control advances to block 2618 where the efficiency analyzer 1414 and/or the utilization analyzer 1416 calculate relevant statistics based on the requested information. At block 2620, the example GUI generator 1420 renders a graphical user interface with the relevant statistics. Thereafter, control advances to block 2628. If, at block 2616, no user request is received, control advances directly to block 2628. At block 2628, the example main server 122 determines whether to continue the process. If so, control returns to block 2602. Otherwise, the example process of FIG. 26 ends.

Figure 27:
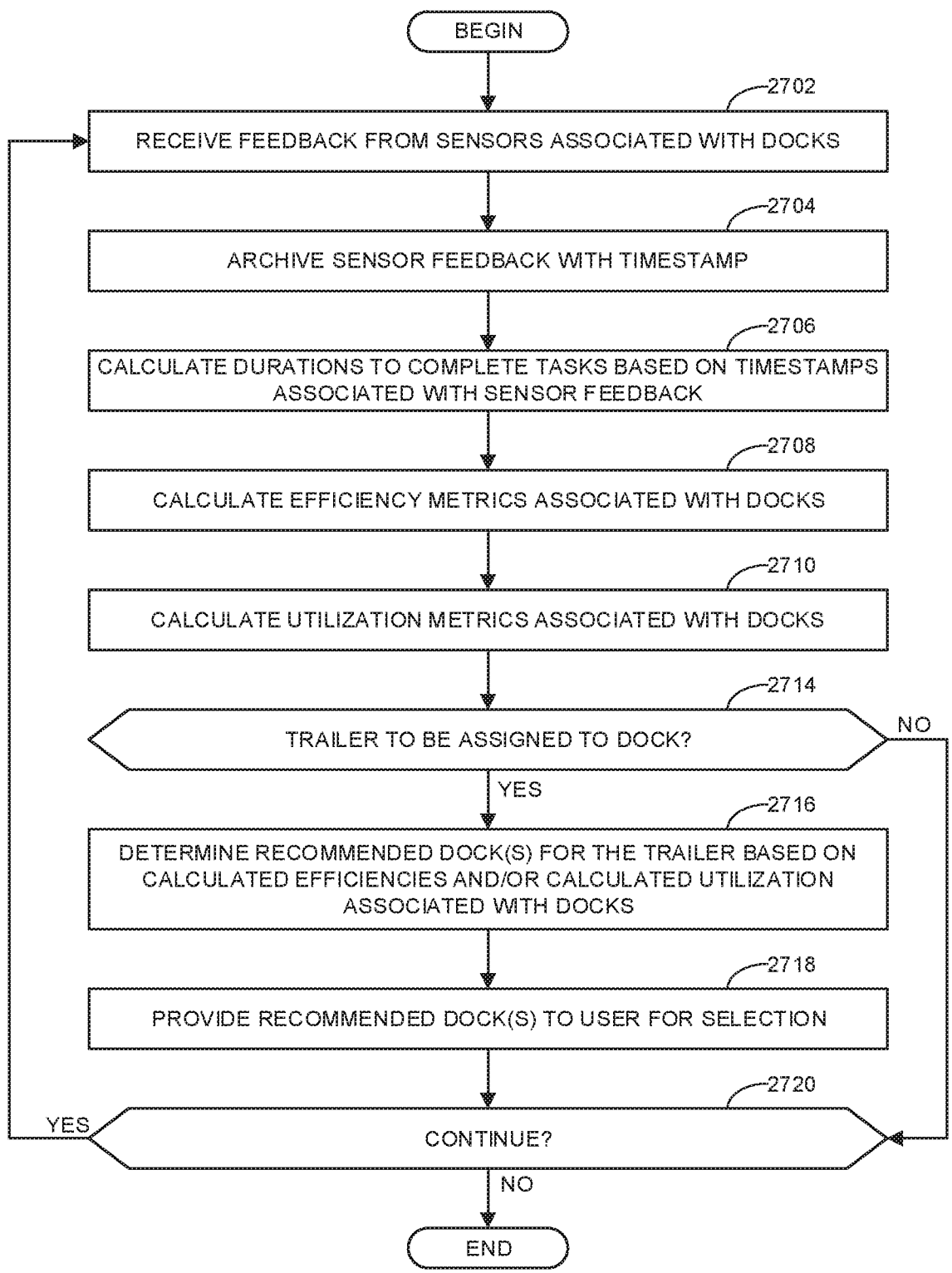

The example program of FIG. 27 begins at block 2702 where the example dock controller interface 1404 receives feedback from sensors associated with docks. At block 2704, the example data logger 1408 archives the sensor feedback with a timestamp (e.g., provided by the example timestamper 1406). At block 2706, the example sensor feedback analyzer 1410 calculates durations to complete tasks based on the timestamps associated with the sensor feedback. At block 2708, the example efficiency analyzer 1414 calculates efficiency metrics associated with the docks. At block 2710, the example utilization analyzer 1416 calculates utilization metrics associated with docks.

At block 2714, the example dock assignment analyzer 1418 determines whether there is a trailer to be assigned. If so, control advances to block 2716, where the example dock assignment analyzer 1418 determines recommended dock(s) for the trailer based on calculated efficiencies and/or calculated utilizations associated with the docks. At block 2718, the example GUI generator 1420 provides the recommended dock(s) to a user for selection. In some examples, the dock assignment analyzer 1418 may automatically assign the trailer to a particular dock based on the efficiencies and/or utilization calculations. Thereafter, control advances to block 2720. If, at block 2714, there is no trailer to be assigned to a dock, control advances directly to block 2720. At block 2720, the example main server 122 determines whether to continue the process. If so, control returns to block 2702. Otherwise, the example process of FIG. 27 ends.

Figure 28:
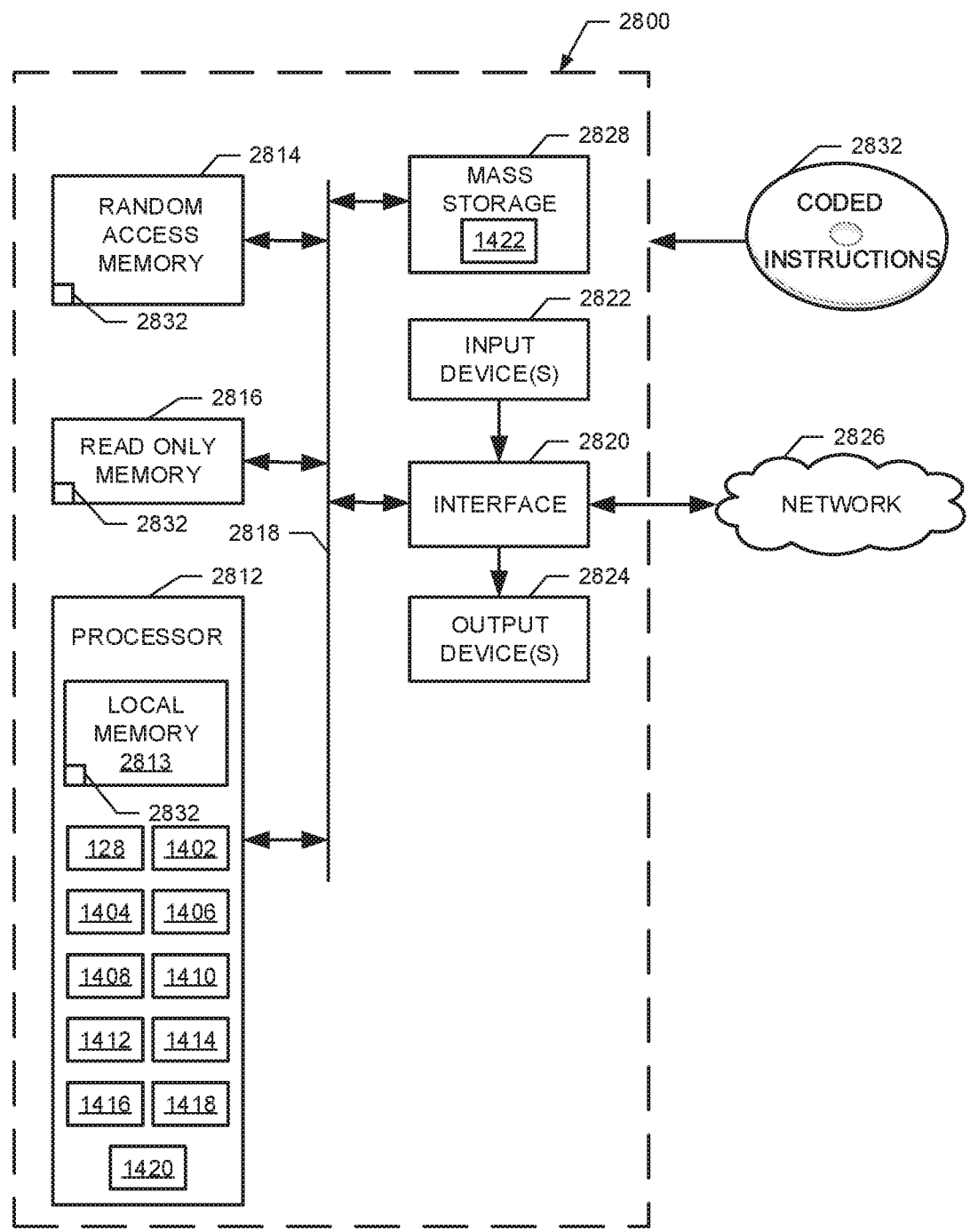
FIG. 28 is a block diagram of an example processing platform structured to execute the instructions of FIG. 3 to implement the example main server of FIGS. 1 and/or 14.

FIG. 28 is a block diagram of an example processor platform 2800 structured to execute the instructions of FIGS. 24-27 to implement the main server 122 of FIGS. 1 and/or 14. The processor platform 2800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 2800 of the illustrated example includes a processor 2812. The processor 2812 of the illustrated example is hardware. For example, the processor 2812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example web server 128, the example network communications interface 1402, the example dock controller interface 1404, the example timestamper 1406, the example data logger 1408, the example sensor feedback analyzer 1410, the example target threshold determiner 1412, the example efficiency analyzer 1414, the example utilization analyzer 1416, the example dock assignment analyzer 1418, and the example GUI generator 1420.

The processor 2812 of the illustrated example includes a local memory 2813 (e.g., a cache). The processor 2812 of the illustrated example is in communication with a main memory including a volatile memory 2814 and a non-volatile memory 2816 via a bus 2818. The volatile memory 2814 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 2816 may be implemented by flash memory and/or any other desired type of memory device. Access to the main memory 2814, 2816 is controlled by a memory controller.

The processor platform 2800 of the illustrated example also includes an interface circuit 2820. The interface circuit 2820 may be implemented by any type of interface standard, such as an Ethernet interface, a universal serial bus (USB), a Bluetooth® interface, a near field communication (NFC) interface, and/or a PCI express interface.

In the illustrated example, one or more input devices 2822 are connected to the interface circuit 2820. The input device(s) 2822 permit(s) a user to enter data and/or commands into the processor 2812. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 2824 are also connected to the interface circuit 2820 of the illustrated example. The output devices 2824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or a speaker. The interface circuit 2820 of the illustrated example, thus, typically includes a graphics driver card, a graphics driver chip, and/or a graphics driver processor.

The interface circuit 2820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 2800 of the illustrated example also includes one or more mass storage devices 2828 for storing software and/or data. Examples of such mass storage devices 2828 include floppy disk drives, hard drive disks, compact disk drives, Blu-ray disk drives, redundant array of independent disks (RAID) systems, and digital versatile disk (DVD) drives. In this example, the mass storage device includes the example memory 1422.

The machine executable instructions 2832 of FIGS. 24-27 may be stored in the mass storage device 2828, in the volatile memory 2814, in the non-volatile memory 2816, and/or on a removable non-transitory computer readable storage medium such as a CD or DVD.

From the foregoing, it will be appreciated that example methods, apparatus, and articles of manufacture have been disclosed that enable the collection and analyzes of data representative of tasks associated with one or more docks in a material handling facility to track the progress of the sequence of operations associated with the loading and/or unloading of trailers parked at such docks. Further, such data may be archived and analyzed to identify or develop target thresholds that can be used as benchmarks for comparing the progress of the sequence of operations in associated with future trailer loads. Further, the archived data may be analyzed to identify factors and/or circumstances enabling increased efficiencies in the sequence of operations for particular docks. Further, analysis of archived data may be used to determine the utilization of different docks to facilitate trailer assignments to particular docks in a manner that manages (e.g., reduces or concentrates) wear of equipment associated with any particular dock or group of docks.

Example methods, apparatus, systems, and articles of manufacture to monitor and manage loading dock operations are disclosed herein. Further examples and combinations thereof include the following:

Example 1 includes an apparatus comprising a sensor feedback analyzer to analyze feedback from sensors associated with a dock at a material handling facility to determine durations for completion of tasks in a sequence of operations associated with loading or unloading of a trailer at the dock based on the feedback, an efficiency analyzer to compare the durations to target thresholds associated with the tasks, and a user interface generator to generate a user interface indicating at least one of the durations or the target thresholds.

Example 2 includes the apparatus of example 1, wherein the user interface generator is to generate a timeline indicating when successive ones of the tasks were completed relative to previous ones of the tasks.

Example 3 includes the apparatus of example 2, wherein the loading or unloading of the trailer includes an arrival phase, a material handling phase, and a departure phase, wherein the timeline extends in a first direction during the arrival phase, a second direction during the material handling phase, and a third direction during the departure phase, the first direction different than the second direction, the second direction different than the third direction.

Example 4 includes the apparatus of example 2, wherein the timeline is a first timeline, the user interface generator to generate a second timeline based on the target thresholds for the tasks.

Example 5 includes the apparatus of example 1, further including memory to store the durations for the completion of the tasks, and a target threshold determiner to update the target thresholds based on the stored durations.

Example 6 includes the apparatus of example 1, further including a utilization analyzer to determine utilization metrics for different docks at the material handling facility, and a dock assignment analyzer to assign a new trailer to one of the different docks based on the utilization metrics.

Example 7 includes the apparatus of example 6, wherein the user interface generator is to generate a utilization heat map for the different docks based on the utilization metrics.

Example 8 includes the apparatus of example 1, wherein the user interface generator is to generate a timing indicator to provide an indication of time relative to a first one of the target thresholds while a first one of the tasks is being completed.

Example 9 includes the apparatus of example 8, wherein the timing indicator counts up to indicate an amount of elapsed time since at least one of a beginning of the first task or the completion of a task previous to the first task.

Example 10 includes the apparatus of example 8, wherein the timing indicator counts down from a time corresponding to the first target threshold to indicate an amount of time remaining to complete the first task within the first target threshold.

Example 11 includes a non-transitory computer readable medium comprising instructions that, when executed, cause a machine to at least analyze feedback from sensors associated with a dock at a material handling facility to determine durations for completion of tasks in a sequence of operations associated with loading or unloading of a trailer at the dock based on the feedback, compare the durations to target thresholds associated with the tasks, and generate a user interface indicating at least one of the durations or the target thresholds.

Example 12 includes the non-transitory computer readable medium of example 11, wherein the instructions further cause the machine to generate a timeline indicating when successive ones of the tasks were completed relative to previous ones of the tasks.

Example 13 includes the non-transitory computer readable medium of example 12, wherein the loading or unloading of the trailer includes an arrival phase, a material handling phase, and a departure phase, wherein the timeline extends in a first direction during the arrival phase, a second direction during the material handling phase, and a third direction during the departure phase, the first direction different than the second direction, the second direction different than the third direction.

Example 14 includes the non-transitory computer readable medium of example 12, wherein the timeline is a first timeline, the instructions further causing the machine to generate a second timeline based on the target thresholds for the tasks.

Example 15 includes the non-transitory computer readable medium of example 11, wherein the instructions further cause the machine to store the durations for the completion of the tasks, and update the target thresholds based on the stored durations.

Example 16 includes the non-transitory computer readable medium of example 11, wherein the instructions further cause the machine to determine utilization metrics for different docks at the material handling facility, and assign a new trailer to one of the different docks based on the utilization metrics.

Example 17 includes the non-transitory computer readable medium of example 16, wherein the instructions further cause the machine to generate a utilization heat map for the different docks based on the utilization metrics.

Example 18 includes the non-transitory computer readable medium of example 11, wherein the instructions further cause the machine to generate a timing indicator to provide an indication of time relative to a first one of the target thresholds while a first one of the tasks is being completed.

Example 19 includes the non-transitory computer readable medium of example 18, wherein the timing indicator counts up to indicate an amount of elapsed time since at least one of a beginning of the first task or the completion of a task previous to the first task.

Example 20 includes the non-transitory computer readable medium of example 18, wherein the timing indicator counts down from a time corresponding to the first target threshold to indicate an amount of time remaining to complete the first task within the first target threshold.

Example 21 includes a method comprising analyzing feedback from sensors associated with a dock at a material handling facility to determine durations for completion of tasks in a sequence of operations associated with loading or unloading of a trailer at the dock based on the feedback, comparing the durations to target thresholds associated with the tasks, and generating a user interface indicating at least one of the durations or the target thresholds.

Example 22 includes the method of example 21, further including generating a timeline indicating when successive ones of the tasks were completed relative to previous ones of the tasks.

Example 23 includes the method of example 22, wherein the loading or unloading of the trailer includes an arrival phase, a material handling phase, and a departure phase, wherein the timeline extends in a first direction during the arrival phase, a second direction during the material handling phase, and a third direction during the departure phase, the first direction different than the second direction, the second direction different than the third direction.

Example 24 includes the method of example 22, wherein the timeline is a first timeline, the method further including generating a second timeline based on the target thresholds for the tasks.

Example 25 includes the method of example 21, further including storing the durations for the completion of the tasks, and updating the target thresholds based on the stored durations.

Example 26 includes the method of example 21, further including determining utilization metrics for different docks at the material handling facility, and assigning a new trailer to one of the different docks based on the utilization metrics.

Example 27 includes the method of example 26, further including generating a utilization heat map for the different docks based on the utilization metrics.

Example 28 includes the method of example 21, further including generating a timing indicator to provide an indication of time relative to a first one of the target thresholds while a first one of the tasks is being completed.

Example 29 includes the method of example 28, wherein the timing indicator counts up to indicate an amount of elapsed time since at least one of a beginning of the first task or the completion of a task previous to the first task.

Example 30 includes the method of example 28, wherein the timing indicator counts down from a time corresponding to the first target threshold to indicate an amount of time remaining to complete the first task within the first target threshold.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   memory;
   interface circuitry to obtain feedback from (i) a trailer sensor that is to detect a presence of a trailer at a dock at a material handling facility, (ii) a vehicle restraint that is to secure the trailer at the dock, (iii) a door sensor that is to monitor a state of a door at the dock, and (iv) a dock leveler that is to span a gap between the trailer and a platform of the dock;
   machine-readable instructions; and
   at least one processor circuit to be programmed by the machine-readable instructions to:
     analyze the feedback to determine durations for completion of tasks in a sequence of operations associated with at least one of loading or unloading of the trailer at the dock, the tasks in the sequence of operations including (i) positioning the trailer at the dock, (ii) activating the vehicle restraint to secure the trailer at the dock, (iii) opening the door, and (iv) activating the dock leveler to span the gap between the trailer and the platform of the dock;
     compare the durations to target thresholds associated with the tasks; and
     generate a user interface indicating at least one of the durations, the target thresholds, or differences between the durations and the target thresholds.

2. The apparatus of claim 1, wherein one or more of the at least one processor circuit is to generate a timeline indicating when successive ones of the tasks were completed relative to previous ones of the tasks.

3. The apparatus of claim 2, wherein the at least one of the loading or unloading of the trailer includes an arrival phase, a material handling phase, and a departure phase, the timeline extends in a first direction during the arrival phase, a second direction during the material handling phase, and a third direction during the departure phase, the first direction is different than the second direction, and the second direction is different than the third direction.

4. The apparatus of claim 2, wherein the timeline is a first timeline, and one or more of the at least one processor circuit is to generate a second timeline based on the target thresholds for the tasks.

5. The apparatus of claim 1, wherein the memory is to store the durations for the completion of the tasks, and one or more of the at least one processor circuit is to update the target thresholds based on the stored durations.

6. The apparatus of claim 1, wherein one or more of the at least one processor circuit is to:
   determine utilization metrics for different docks at the material handling facility; and
   assign a new trailer to one of the different docks based on the utilization metrics.

7. The apparatus of claim 6, wherein one or more of the at least one processor circuit is to generate a utilization heat map for the different docks based on the utilization metrics.

8. The apparatus of claim 1, wherein one or more of the at least one processor circuit is to generate a timing indicator to provide an indication of time relative to a first one of the target thresholds while a first one of the tasks is being completed.

9. The apparatus of claim 8, wherein the timing indicator counts up to indicate an amount of elapsed time since at least one of a beginning of the first task or the completion of a task previous to the first task.

10. The apparatus of claim 8, wherein the timing indicator counts down from a time corresponding to the first target threshold to indicate an amount of time remaining to complete the first task within the first target threshold.

11. A non-transitory computer readable medium comprising instructions to cause at least one processor circuit to at least:
   access feedback from (i) a dock leveler that is to span a gap between a trailer at a dock of a material handling facility and a platform of the dock, (ii) a door sensor that is to monitor a status of a door at the dock, (iii) a vehicle restraint that is to secure the trailer at the dock, and (iv) a trailer sensor that is to detect a presence of the trailer at the dock;
   analyze the feedback to determine durations of tasks in a sequence of operations associated with at least one of loading or unloading of the trailer at the dock, the tasks in the sequence of operations including (i) moving the dock leveler to a stored position spaced apart from the trailer, (ii) closing the door, (iii) de-activating the vehicle restraint to release the trailer, and (iv) moving the trailer away from the dock;
   compare the durations to target thresholds associated with the tasks; and
   generate a user interface indicating at least one of the durations, the target thresholds, or differences between the durations and the target thresholds.

12. The non-transitory computer readable medium of claim 11, wherein the instructions are to cause one or more of the at least one processor circuit to generate a timeline indicating when successive ones of the tasks were completed relative to previous ones of the tasks.

13. The non-transitory computer readable medium of claim 12, wherein the at least one of the loading or unloading of the trailer includes an arrival phase, a material handling phase, and a departure phase, the timeline extends in a first direction during the arrival phase, a second direction during the material handling phase, and a third direction during the departure phase, the first direction is different than the second direction, and the second direction is different than the third direction.

14. The non-transitory computer readable medium of claim 12, wherein the timeline is a first timeline, and the instructions are to cause one or more of the at least one processor circuit to generate a second timeline based on the target thresholds for the tasks.

15. The non-transitory computer readable medium of claim 11, wherein the instructions are to cause one or more of the at least one processor circuit to:
cause storage of the durations of the tasks; and
update the target thresholds based on the stored durations.

16. The non-transitory computer readable medium of claim 11, wherein the instructions are to cause one or more of the at least one processor circuit to:
determine utilization metrics for different docks at the material handling facility; and
assign a new trailer to one of the different docks based on the utilization metrics.

17. The non-transitory computer readable medium of claim 16, wherein the instructions are to cause one or more of the at least one processor circuit to generate a utilization heat map for the different docks based on the utilization metrics.

18. The non-transitory computer readable medium of claim 11, wherein the instructions are to cause one or more of the at least one processor circuit to generate a timing indicator to provide an indication of time relative to a first one of the target thresholds while a first one of the tasks is being completed.

19. The non-transitory computer readable medium of claim 18, wherein the timing indicator counts up to indicate an amount of elapsed time since at least one of a beginning of the first task or the completion of a task previous to the first task.

20. The non-transitory computer readable medium of claim 18, wherein the timing indicator counts down from a time corresponding to the first target threshold to indicate an amount of time remaining to complete the first task within the first target threshold.

21. A method comprising:
obtaining feedback from (i) a trailer sensor that is to detect a presence of a trailer at a dock at a material handling facility, (ii) a vehicle restraint that is to secure the trailer at the dock, (iii) a door sensor that is to monitor a status of a door at the dock, and (iv) a dock leveler that is to span a gap between the trailer and a platform of the dock;
analyzing the feedback to determine durations for completion of tasks in a sequence of operations associated with at least one of loading or unloading of the trailer at the dock, the tasks in the sequence of operations including (i) positioning the trailer at the dock, (ii) activating the vehicle restraint to secure the trailer at the dock, (iii) opening the door, and (iv) activating the dock leveler to span the gap between the trailer and the platform of the dock;
comparing the durations to target thresholds associated with the tasks; and
generating, by executing instructions with at least one processor circuit, a user interface indicating at least one of the durations, the target thresholds, or differences between the durations and the target thresholds.

22. The method of claim 21, further including generating a timeline indicating when successive ones of the tasks were completed relative to previous ones of the tasks.

23. The method of claim 22, wherein the at least one of the loading or unloading of the trailer includes an arrival phase, a material handling phase, and a departure phase, the timeline extends in a first direction during the arrival phase, a second direction during the material handling phase, and a third direction during the departure phase, the first direction is different than the second direction, and the second direction is different than the third direction.

24. The method of claim 22, wherein the timeline is a first timeline, the method further including generating a second timeline based on the target thresholds for the tasks.

25. The method of claim 21, further including:
storing the durations for the completion of the tasks; and
updating the target thresholds based on the stored durations.

26. The method of claim 21, further including:
determining utilization metrics for different docks at the material handling facility; and
assigning a new trailer to one of the different docks based on the utilization metrics.

27. The method of claim 26, further including generating a utilization heat map for the different docks based on the utilization metrics.

28. The method of claim 21, further including generating a timing indicator to provide an indication of time relative to a first one of the target thresholds while a first one of the tasks is being completed.

29. The method of claim 28, wherein the timing indicator counts up to indicate an amount of elapsed time since at least one of a beginning of the first task or the completion of a task previous to the first task.

30. The method of claim 28, wherein the timing indicator counts down from a time corresponding to the first target threshold to indicate an amount of time remaining to complete the first task within the first target threshold.

* * * * *